(12) United States Patent
Witkowski et al.

(10) Patent No.: US 7,970,446 B2
(45) Date of Patent: Jun. 28, 2011

(54) WIRELESS CONTROL SYSTEM AND METHOD

(75) Inventors: Todd R. Witkowski, Zeeland, MI (US);
Kurt A. Dykema, Holland, MI (US);
Steven L. Geerlings, Holland, MI (US);
Mark L. Zeinstra, Holland, MI (US);
Robert F. Buege, Lowell, MI (US)

(73) Assignee: Johnson Controls Technology Company, Holland, MI (US)

( * ) Notice: Subject to any disclaimer, the term of this patent is extended or adjusted under 35 U.S.C. 154(b) by 585 days.

(21) Appl. No.: 11/963,576

(22) Filed: Dec. 21, 2007

(65) Prior Publication Data

US 2008/0161047 A1 Jul. 3, 2008

Related U.S. Application Data

(63) Continuation of application No. 10/336,466, filed on Jan. 3, 2003, now Pat. No. 7,346,374, which is a continuation-in-part of application No. 09/979,199, filed as application No. PCT/US00/14692 on May 26, 2000, now Pat. No. 7,257,426.

(60) Provisional application No. 60/135,979, filed on May 26, 1999.

(51) Int. Cl.
*H04M 1/00* (2006.01)
(52) U.S. Cl. ........... 455/575.9; 455/41.2; 455/556.1; 455/569.2; 340/825.69; 340/825.71; 340/825.72
(58) Field of Classification Search .......... 455/41.2, 455/41.3, 345, 556.1, 556.2, 557, 569.2, 455/575.9; 340/825.69, 825.71, 825.72
See application file for complete search history.

(56) References Cited

U.S. PATENT DOCUMENTS

| | | | |
|---|---|---|---|
| 4,297,528 A | 10/1981 | Beno | |
| 4,389,109 A | 6/1983 | Taniguchi et al. | |
| 4,394,538 A | 7/1983 | Warren et al. | |
| 4,401,852 A | 8/1983 | Noso et al. | |
| 4,415,767 A | 11/1983 | Gill et al. | |
| 4,450,545 A | 5/1984 | Kishi et al. | |
| 4,462,080 A | 7/1984 | Johnstone et al. | |
| 4,493,100 A | 1/1985 | Moriyama et al. | |
| 4,501,012 A | 2/1985 | Kishi et al. | |
| 4,506,377 A | 3/1985 | Kishi et al. | |
| 4,506,378 A | 3/1985 | Noso et al. | |
| 4,509,133 A | 4/1985 | Monbaron et al. | |

(Continued)

FOREIGN PATENT DOCUMENTS

DE 3417956 11/1985

(Continued)

OTHER PUBLICATIONS

U.S. Appl. No. 11/810,253, filed Jun. 5, 2007, Witkowski et al.

(Continued)

*Primary Examiner* — Tuan H Nguyen
(74) *Attorney, Agent, or Firm* — Foley & Lardner LLP

(57) ABSTRACT

A wireless control system for use in a vehicle and for use with a remote electronic system is provided. The wireless control system includes a transceiver for mounting in the vehicle. The transceiver is configured to communicate according to a Bluetooth communications standard. The transceiver is further configured to provide a control signal to the remote electronic system. The transceiver is also trainable to provide a carrier frequency and control information for the control signal.

7 Claims, 15 Drawing Sheets

U.S. PATENT DOCUMENTS

| | | |
|---|---|---|
| 4,516,207 A | 5/1985 | Moriyama et al. |
| 4,528,687 A | 7/1985 | Noso et al. |
| 4,532,648 A | 7/1985 | Noso et al. |
| 4,538,295 A | 8/1985 | Noso et al. |
| 4,558,459 A | 12/1985 | Noso et al. |
| 4,637,045 A | 1/1987 | Noso et al. |
| 4,644,107 A | 2/1987 | Clowes et al. |
| 4,731,811 A | 3/1988 | Dubus |
| 4,827,520 A | 5/1989 | Zeinstra |
| 4,845,738 A | 7/1989 | Takano |
| 4,875,229 A | 10/1989 | Palett et al. |
| 4,905,270 A | 2/1990 | Ono |
| 5,113,182 A | 5/1992 | Suman et al. |
| 5,278,547 A | 1/1994 | Suman et al. |
| 5,333,177 A | 7/1994 | Braitberg et al. |
| 5,343,399 A | 8/1994 | Yokoyama et al. |
| 5,416,828 A | 5/1995 | Hiramatsu et al. |
| 5,444,761 A | 8/1995 | Nagashima |
| 5,475,366 A | 12/1995 | Van Lente et al. |
| 5,479,155 A | 12/1995 | Zeinstra et al. |
| 5,479,157 A | 12/1995 | Suman et al. |
| 5,479,474 A | 12/1995 | Schwartzman et al. |
| 5,479,479 A | 12/1995 | Braitberg et al. |
| 5,490,213 A | 2/1996 | Huang |
| 5,500,880 A | 3/1996 | Kellerman |
| 5,535,274 A | 7/1996 | Braitberg et al. |
| 5,555,286 A | 9/1996 | Tendler |
| 5,556,017 A | 9/1996 | Troy |
| 5,559,880 A | 9/1996 | Shiono |
| 5,561,704 A | 10/1996 | Salimando |
| 5,583,485 A | 12/1996 | Van Lente et al. |
| 5,584,052 A | 12/1996 | Gulau et al. |
| 5,604,470 A | 2/1997 | Atokawa |
| 5,614,885 A | 3/1997 | Van Lente et al. |
| 5,614,891 A | 3/1997 | Zeinstra et al. |
| 5,619,190 A | 4/1997 | Duckworth et al. |
| 5,625,673 A | 4/1997 | Grewe et al. |
| 5,627,529 A | 5/1997 | Duckworth et al. |
| 5,627,547 A | 5/1997 | Ramaswamy et al. |
| 5,631,947 A | 5/1997 | Wittstein et al. |
| 5,632,521 A | 5/1997 | Archambault et al. |
| 5,646,701 A | 7/1997 | Duckworth et al. |
| 5,651,056 A | 7/1997 | Eting et al. |
| 5,659,594 A | 8/1997 | Toda |
| 5,659,887 A | 8/1997 | Ooe |
| 5,661,455 A | 8/1997 | Van Lente et al. |
| 5,661,651 A | 8/1997 | Dykema et al. |
| 5,691,848 A | 11/1997 | Van Lente et al. |
| 5,699,044 A | 12/1997 | Van Lente et al. |
| 5,699,054 A | 12/1997 | Duckworth |
| 5,699,055 A | 12/1997 | Dykema et al. |
| 5,708,415 A | 1/1998 | Van Lente et al. |
| 5,715,522 A | 2/1998 | Vimpari et al. |
| 5,717,387 A | 2/1998 | Suman et al. |
| 5,732,074 A | 3/1998 | Spaur et al. |
| 5,751,251 A | 5/1998 | Hutchinson |
| 5,754,962 A | 5/1998 | Griffin |
| 5,758,300 A | 5/1998 | Abe |
| 5,767,788 A | 6/1998 | Ness |
| 5,771,303 A | 6/1998 | Mazzarella et al. |
| 5,797,088 A | 8/1998 | Stamegna |
| 5,802,167 A | 9/1998 | Hong |
| 5,803,325 A | 9/1998 | Wang |
| 5,809,135 A | 9/1998 | Chang |
| 5,810,420 A | 9/1998 | Welling |
| 5,822,427 A | 10/1998 | Braitberg et al. |
| 5,828,750 A | 10/1998 | Perälä |
| 5,832,390 A | 11/1998 | Irvin |
| 5,836,563 A | 11/1998 | Hsin-Yung |
| 5,839,919 A | 11/1998 | Chen |
| 5,844,473 A | 12/1998 | Kaman |
| 5,844,987 A | 12/1998 | Matthews et al. |
| 5,854,593 A | 12/1998 | Dykema et al. |
| 5,859,628 A | 1/1999 | Ross et al. |
| 5,860,824 A | 1/1999 | Fan |
| 5,864,603 A | 1/1999 | Haavisto et al. |
| 5,878,360 A | 3/1999 | Nishino et al. |
| 5,889,472 A | 3/1999 | Nagel et al. |
| 5,889,474 A | 3/1999 | LaDue |
| 5,896,375 A | 4/1999 | Dent et al. |
| 5,898,392 A | 4/1999 | Bambini et al. |
| 5,903,226 A | 5/1999 | Suman et al. |
| 5,917,907 A | 6/1999 | Kela |
| 5,926,087 A | 7/1999 | Busch et al. |
| 5,940,502 A | 8/1999 | Hirai et al. |
| 5,966,285 A | 10/1999 | Sellers |
| 5,967,851 A | 10/1999 | Ozer et al. |
| 5,974,333 A | 10/1999 | Chen |
| 5,974,334 A | 10/1999 | Jones, Jr. |
| 5,982,149 A | 11/1999 | Shih |
| 5,990,840 A | 11/1999 | Chang |
| 5,992,807 A | 11/1999 | Tarulli |
| 5,995,824 A | 11/1999 | Whitfield |
| 5,995,898 A | 11/1999 | Tuttle |
| 6,009,320 A | 12/1999 | Dudley |
| 6,023,241 A | 2/2000 | Clapper |
| 6,028,537 A | 2/2000 | Suman et al. |
| 6,031,492 A | 2/2000 | Griffin et al. |
| 6,038,441 A | 3/2000 | Slaven et al. |
| 6,052,603 A | 4/2000 | Kinzalow et al. |
| 6,055,468 A | 4/2000 | Kaman et al. |
| 6,056,175 A | 5/2000 | Mieglitz et al. |
| 6,058,184 A | 5/2000 | Frank |
| 6,058,298 A | 5/2000 | Stamegna |
| 6,058,319 A | 5/2000 | Sadler |
| 6,069,558 A | 5/2000 | Kershaw |
| 6,069,588 A * | 5/2000 | O'Neill, Jr. .................. 343/713 |
| 6,076,777 A | 6/2000 | Färm |
| 6,078,252 A | 6/2000 | Kulczycki et al. |
| 6,081,237 A | 6/2000 | Sato et al. |
| 6,085,078 A | 7/2000 | Stamegna |
| 6,091,343 A * | 7/2000 | Dykema et al. .......... 340/825.69 |
| 6,101,403 A | 8/2000 | Masuda |
| 6,108,566 A | 8/2000 | Albanese et al. |
| 6,108,567 A | 8/2000 | Hosonuma |
| 6,122,514 A | 9/2000 | Spaur et al. |
| 6,128,482 A | 10/2000 | Nixon et al. |
| 6,131,019 A | 10/2000 | King |
| 6,134,456 A | 10/2000 | Chen |
| 6,138,041 A | 10/2000 | Yahia |
| 6,144,114 A | 11/2000 | Chutorash |
| 6,148,212 A | 11/2000 | Park et al. |
| 6,154,148 A | 11/2000 | Fluharty et al. |
| 6,154,663 A | 11/2000 | Itamochi |
| 6,163,711 A | 12/2000 | Juntunen et al. |
| 6,169,955 B1 | 1/2001 | Fultz |
| 6,173,195 B1 | 1/2001 | Chen |
| 6,177,905 B1 | 1/2001 | Welch |
| 6,198,947 B1 | 3/2001 | Barber |
| 6,202,008 B1 | 3/2001 | Beckert et al. |
| 6,209,767 B1 | 4/2001 | Liou |
| 6,215,449 B1 | 4/2001 | O'Neill, Jr. |
| 6,218,958 B1 | 4/2001 | Eichstaedt et al. |
| 6,226,497 B1 | 5/2001 | Güntzer et al. |
| 6,226,529 B1 | 5/2001 | Bruno et al. |
| 6,230,030 B1 | 5/2001 | Lu |
| 6,236,333 B1 | 5/2001 | King |
| 6,240,303 B1 | 5/2001 | Katzur |
| 6,246,766 B1 | 6/2001 | Walsh |
| 6,271,765 B1 | 8/2001 | King et al. |
| 6,285,757 B1 | 9/2001 | Carroll et al. |
| 6,304,764 B1 | 10/2001 | Pan |
| 6,308,083 B2 | 10/2001 | King |
| 6,320,514 B1 | 11/2001 | Flick |
| 6,326,613 B1 | 12/2001 | Heslin et al. |
| 6,333,698 B1 | 12/2001 | Roddy |
| 6,336,038 B1 | 1/2002 | Nojima et al. |
| 6,340,928 B1 | 1/2002 | McCurdy |
| 6,345,102 B1 | 2/2002 | Davis et al. |
| 6,349,222 B1 | 2/2002 | Hafiz |
| 6,356,645 B1 | 3/2002 | Trenkle |
| 6,356,646 B1 | 3/2002 | Spencer |
| 6,359,348 B1 | 3/2002 | King |
| 6,363,156 B1 | 3/2002 | Roddy |
| 6,366,213 B2 | 4/2002 | DeLine et al. |
| 6,377,172 B1 | 4/2002 | Neer |
| 6,377,825 B1 | 4/2002 | Kennedy et al. |

| | | |
|---|---|---|
| 6,389,337 B1 | 5/2002 | Kolls |
| 6,397,086 B1 | 5/2002 | Chen |
| 6,408,232 B1 | 6/2002 | Cannon et al. |
| 6,484,040 B1 | 11/2002 | Wang |
| 6,505,057 B1 | 1/2003 | Finn et al. |
| 6,516,192 B1 | 2/2003 | Spaur et al. |
| 6,522,754 B1 | 2/2003 | Long et al. |
| 6,525,645 B2 | 2/2003 | King et al. |
| 6,532,374 B1 | 3/2003 | Chennakeshu et al. |
| 6,542,758 B1 | 4/2003 | Chennakeshu et al. |
| 6,549,130 B1 | 4/2003 | Joao |
| 6,549,793 B1 | 4/2003 | Baratono |
| 6,549,973 B1 | 4/2003 | Kibashi et al. |
| 6,556,681 B2 | 4/2003 | King |
| 6,559,775 B1 | 5/2003 | King |
| 6,560,344 B1 | 5/2003 | Julstrom et al. |
| 6,600,430 B2 | 7/2003 | Minagawa et al. |
| 6,625,426 B2 | 9/2003 | Baratono et al. |
| 6,696,983 B2 | 2/2004 | Tang et al. |
| 6,724,322 B2 | 4/2004 | Tang et al. |
| 6,765,471 B1 | 7/2004 | Baudard et al. |
| 6,906,632 B2 | 6/2005 | DeLine et al. |
| 7,034,238 B2 | 4/2006 | Uleski et al. |
| 7,039,397 B2 | 5/2006 | Chuey |
| 7,042,342 B2 | 5/2006 | Luo et al. |
| 7,047,039 B2 | 5/2006 | Lalley |
| 7,049,982 B2 | 5/2006 | Sleboda et al. |
| 7,050,794 B2 | 5/2006 | Chuey et al. |
| 7,068,181 B2 | 6/2006 | Chuey |
| 7,084,781 B2 | 8/2006 | Chuey |
| 7,106,171 B1 | 9/2006 | Burgess |
| 7,113,857 B2 | 9/2006 | Ilan et al. |
| 7,145,507 B2 | 12/2006 | Luo et al. |
| 7,170,400 B2 | 1/2007 | Cowelchuk et al. |
| 7,183,941 B2 | 2/2007 | Chuey |
| 7,197,278 B2 | 3/2007 | Harwood et al. |
| 7,257,426 B1 | 8/2007 | Witkowski et al. |
| 7,346,374 B2 | 3/2008 | Witkowski et al. |
| 7,349,722 B2 | 3/2008 | Witkowski et al. |
| 2001/0007086 A1 | 7/2001 | Rogers et al. |
| 2001/0011302 A1 | 8/2001 | Son |
| 2001/0045774 A1 | 11/2001 | Rode |
| 2001/0055165 A1 | 12/2001 | McCarthy et al. |
| 2002/0004702 A1 | 1/2002 | Ruhl |
| 2002/0013138 A1 | 1/2002 | Benthin et al. |
| 2002/0013730 A1 | 1/2002 | Bigus |
| 2002/0025832 A1 | 2/2002 | Durian et al. |
| 2002/0032510 A1 | 3/2002 | Turnbull et al. |
| 2002/0039417 A1 | 4/2002 | Walsh |
| 2002/0049535 A1 | 4/2002 | Rigo et al. |
| 2002/0085043 A1 | 7/2002 | Ribak |
| 2002/0087238 A1 | 7/2002 | Matsui |
| 2002/0120925 A1 | 8/2002 | Logan |
| 2002/0138180 A1 | 9/2002 | Hessing et al. |
| 2002/0152027 A1 | 10/2002 | Allen |
| 2002/0152264 A1 | 10/2002 | Yamasaki |
| 2002/0197955 A1 | 12/2002 | Witkowski et al. |
| 2003/0228879 A1 | 12/2003 | Witkowski et al. |
| 2004/0033821 A1 | 2/2004 | Slesak et al. |
| 2004/0048622 A1 | 3/2004 | Witkowski et al. |
| 2004/0089141 A1 | 5/2004 | Georges et al. |
| 2004/0110472 A1 | 6/2004 | Witkowski et al. |
| 2004/0117442 A1 | 6/2004 | Thielen |
| 2004/0145491 A1 | 7/2004 | Nascimento |
| 2004/0203379 A1 | 10/2004 | Witkowski et al. |
| 2005/0090279 A9 | 4/2005 | Witkowski et al. |
| 2005/0143134 A1 | 6/2005 | Harwood et al. |
| 2005/0155068 A1 | 7/2005 | Chang |
| 2005/0223406 A1 | 10/2005 | Vitito |
| 2005/0235326 A1 | 10/2005 | Vitito |
| 2005/0235327 A1 | 10/2005 | Vitito |
| 2005/0239434 A1 | 10/2005 | Marlowe |
| 2005/0281414 A1 | 12/2005 | Simon et al. |
| 2006/0034481 A1 | 2/2006 | Barzegar et al. |
| 2006/0070102 A1 | 3/2006 | Vitito |
| 2006/0168627 A1 | 7/2006 | Zeinstra et al. |
| 2007/0061067 A1 | 3/2007 | Zeinstra et al. |
| 2007/0082706 A1 | 4/2007 | Campbell et al. |
| 2007/0233725 A1 | 10/2007 | Michmerhuizen et al. |

| | | |
|---|---|---|
| 2008/0045274 A1 | 2/2008 | Witkowski et al. |
| 2008/0161047 A1 | 7/2008 | Witkowski et al. |
| 2009/0079712 A1* | 3/2009 | Levin et al. .................. 345/184 |

FOREIGN PATENT DOCUMENTS

| | | |
|---|---|---|
| DE | 4323144 | 1/1995 |
| DE | 196 29 408 | 1/1998 |
| DE | 197 28 083 | 2/1999 |
| DE | 199 17 169 | 11/2000 |
| EP | 0 148 714 | 7/1985 |
| EP | 0 410 698 | 1/1991 |
| EP | 0 592 163 | 4/1994 |
| EP | 0 663 749 | 7/1995 |
| EP | 0 746 129 | 12/1996 |
| EP | 0 751 043 | 1/1997 |
| EP | 0 770 749 | 2/1997 |
| EP | 0 780 992 | 6/1997 |
| EP | 0 821 429 | 1/1998 |
| EP | 0 845 392 | 6/1998 |
| EP | 0 847 899 | 6/1998 |
| EP | 0 904 984 | 3/1999 |
| EP | 0 920 170 | 6/1999 |
| EP | 0 926 648 A2 | 6/1999 |
| EP | 1024626 | 8/2000 |
| EP | 1043179 | 10/2000 |
| EP | 1052834 | 11/2000 |
| EP | 1194903 | 4/2002 |
| EP | 1216900 | 6/2002 |
| EP | 1 246 414 A2 | 10/2002 |
| EP | 0 941 532 B1 | 8/2004 |
| EP | 1852836 A2 | 11/2007 |
| GB | 2 264 613 | 9/1993 |
| GB | 2 279 852 | 1/1995 |
| GB | 2 296 157 | 6/1996 |
| WO | WO 96/32783 | 10/1996 |
| WO | WO 98/04051 A1 | 1/1998 |
| WO | WO 98/25248 | 6/1998 |
| WO | WO 98/25248 A1 | 6/1998 |
| WO | WO 98/53384 | 11/1998 |
| WO | WO 98/53584 A1 | 11/1998 |
| WO | WO 99/30429 | 11/1998 |
| WO | WO 98/57824 | 12/1998 |
| WO | WO 99/03254 | 1/1999 |
| WO | WO 99/05839 | 2/1999 |
| WO | WO 99/30429 A1 | 6/1999 |
| WO | WO 00/51293 | 8/2000 |
| WO | WO 00/72463 | 11/2000 |
| WO | WO 01/82532 | 11/2001 |
| WO | WO 01/86881 | 11/2001 |
| WO | WO 2004/064343 A1 | 7/2004 |
| WO | WO 2004/077721 A2 | 9/2004 |
| WO | WO 2008/030952 A2 | 3/2008 |

OTHER PUBLICATIONS

U.S. Appl. No. 11/517,946, filed Sep. 8, 2006, Zeinstra et al.
U.S. Appl. No. 10/371,802, filed Feb. 21, 2003, Witkowski et al.
U.S. Appl. No. 10/364,794, filed Feb. 11, 2003, Witkowski et al.
U.S. Appl. No. 10/326,620, filed Dec. 20, 2002, Witkowski et al.
U.S. Appl. No. 09/979,199, filed Apr. 29, 2002, Witkowski et al.
Andrew Seybold, SWAP: Home RF, Andrew Seybold's Outlook, Mar. 31, 1998, vol. 16, No. 8, 8 pgs.
Briody et al., "Intel to Launch Wireless Initiative", Infoworld, May 18, 1998, 2 pgs.
Haartsen, "Bluetooth—The Universal Radio Interface for Ad Hoc, Wireless Connectivity", Ericcson Review No. 3, 1998, pp. 110-117.
Artwedson et al., "Ericcson's Bluetooth Modules", Ericsson Review No. 4, 1999, pp. 198-205.
International Search Report for PCT/US00/14692 (WO 00/72463), 4 pgs.
International Search Report for PCT/US2004/000088, mailing date Jun. 8, 2004, 3 pgs.
Bluetooth—FAQ (Text Only); May 10, 1999; http://www.bluetooth.com/text/faw/index.asp; printed May 10, 1999; 3 pgs.
"Bluetooth Comes of Age at CEBIT . . . ", INCISOR; News From The Bluetooth And Short Range RF Environment; Apr. 1999; 7 pgs.
Hendy, Jeremy; "The Bluetooth Standard"; Ten Points to Ponder; Top Ten; www.csdmag.com; May 1999; p. 13.

Ohr, Stephan; Harris, National, "Philips tip 2.4-GHz devices as HomeRF spec gains steam; Wireless transcrivers roll toward home nets"; *NEWS*, 2 pgs.
"Startup pins success on Bluetooth wireless"; 1 pg.
Ohr, Stephan; "Pushes wireless standard, aims for $10 price tag"; "Ericsson's transceiver gives bite to Bluetooth"; Electronic Engineering Times; Apr. 19, 1999; 2 pgs.
Bennett F. et al.: "Piconet: Embedded Mobile Networking", IEEE Personal Communications, IEEE Communications Society, US, vol. 4, No. 5, Oct. 1, 1997, pp. 8-15.
Anita Lienert. "Phone Users Will Love New Daimler Chrysler feature; UConnect, voice-activated communication system, gives high-tech convenience." The Detroit News. Aug. 13, 2003. Page 3g in the DRIVE section, 2 pgs.
Wilson Rothman. "Just Click Decaf"; Get Ready for a Fresh Crop of Cool Gadgets—from Internet Ready Coffee Machines to Portable Video Players, to Dolls powered by the Latest Robotics. TIME Magazine. Sep. 8, 2003. p. 70. TIME Inc., 2 pgs.
"Viking Chips to Rule the Radio Waves." The Australian. Sep. 15, 1998. p. 55. Nationwide News Proprietary Ltd., 3 pgs.
Chris Chinnock. "Car PCs Out for a Test Drive Only" Electronic Buyers' News. Nov. 16, 1998. p. 80. CMP Media LLC, 3 pgs.
"New Standard for Wireless Data". Digital Cellular Report. Jun. 4, 1998. vol. 4 Issue 11. Phillips Business Information Inc., 1 pg.
Comprehensive Description of the Bluetooth System, Jun. 17, 1998, 72 pgs.
Result of Consultation for Application No. 00 939 377.8 from the European Patent Office, Jul. 2, 2007, 2 pgs.
Result of Consultation for Application No. 02 076 747.1 from the European Patent Office, Jul. 4, 2007, 9 pgs.
"Technology Overview" Bluetooth Adopter Site, pp. 1-9. Apr. 27, 1999.
"The Bluetooth Development Kit". http://www.symbionics.co.uk/solutions/bluetooth/bluetoothkit, 6 pgs.
"Bluetooth Frequently Asked Questions". http://www.symbionics.co.uk/bluetooth/ 2 pgs.
"Microsoft Introduces Auto PC", The Hansen Report on Automotive Electronics. A Business and Technology Newsletter, Rye, NH, vol. 11, No. 1, Feb. 1998, 8 pgs.
PCT International Search Report PCT/US2004/004566; Nov. 30, 2004, 4 pgs.
Stajano, Frank, Security for Ubiquitous Computing, Feb. 2, 2002, pp. 27-48, John Wiley and Sons.
Result of Consultation regarding European Patent Application No. 00939377.8, European Patent Office, Jul. 6, 2007, 2 pgs.
Summons to Attend Oral Proceedings Pursuant to Rule 71(1) EPC regarding European Patent Application No. 00939377.8, European Patent Office, Aug. 11, 2006, 10 pgs.
Communication Pursuant to Article 96(2) EPC regarding European Patent Application No. 00939377.8, European Patent Office, Feb. 22, 2005, 9 pgs.
Communication Pursuant to Article 96(2) EPC regarding European Patent Application No. 00939377.8, European Patent Office, Apr. 28, 2003, 6 pgs.
Result of Consultation regarding European Patent application No. 02076747.1, European Patent Office, Jul. 4, 2007, 9 pgs.
Summons to Attend Oral Proceedings Pursuant to Rule 71(1) EPC regarding European Patent Application No. 02076747.1, European Patent Office, Feb. 2, 2007, 5 pgs.
Communication Pursuant to Article 96(2) EPC regarding European Patent Application No. 02076747.1, European Patent Office, Sep. 13, 2005, 3 pgs.
Communication Pursuant to Article 96(2) EPC regarding European Patent Application No. 02076747.1, European Patent Office, Apr. 2, 2004, 5 pgs.
European Search Report regarding European Patent Application No. 02076747.1, European Patent Office, Aug. 29, 2003, 3 pgs.
Journalist Comments from Wave II TL Long Lead Event, maintained by Mark Zeinstra et al., 2003-2004, 3 pgs.
2004 Acura TL Long Lead Event—Review of wave one, audio/technology press, maintained by Zeinstra et al., 2003-2004, 3 pgs.
CH Long Lead Media Comments: TL—wave 1 and 2 combined, maintained by Zeinstra et al, 2003-2004, 2 pgs.
Feedback from Audio journalists on Wave 1, maintained by Zeinstra et al., 2003-2004, 3 pgs.
Minutes of the Oral Proceedings Relating to EPO Appl. No. 02076747.1, Aug. 8, 2007, 18 pgs.
Decision to refuse a European Patent Application, Written Decision of the Oral Proceedings Relating to EPO Appl. No. 02076747.1, Aug. 8, 2007, 22 pgs.
Decision to refuse a European Patent application for European Patent Application No. 00 939 377.8; Sep. 14, 2007, 30 pgs.
Provision of the minutes in accordance with Rule 76(4) EPC for European Patent Application No. 00 939 377.8-2211, Sep. 14, 2007, 27 pgs.
U.S. Appl. No. 10/336,466, filed Jan. 3, 2003, Witkowski et al.
U.S. Appl. No. 12/328,668, filed Dec. 4, 2008, Witkowski et al.
Gilroy, Amy, Sony Joins in Music Streaming From Cellphones to Car Audio, printed from website www.twice.com, Aug. 7, 2006, 2 pages.
International Search Report and Written Opinion for International Patent Application No. PCT/US2007/077750, mailed Apr. 2, 2008, 9 pages.
Jain et al., Standard Boosts Automotive Bluetooth Streaming, Automotive Design Line, printed from website www.automotivedesignline.com, Oct. 3, 2005, 7 pages.
Johnston, Lisa, ANYCOM Announces Bluetooth Adapter for iPod Nano, TWICE: This Week in Consumer Electronics, printed from website www.twice.com, Aug. 7, 2006, 1 page.
Picture of in-dash electronic system, 1998.
Pioneer DEH-P9800BT, CD receiver with MP3/WMA playback and Bluetooth wireless, Crutchfield, printed from website www.crutchfield.com on Nov. 27, 2006, 3 pages.
Sony MEX-BT5000, CD receiver with Bluetooth technology and MP3/WMA playback, Crutchfield, printed from website www.crutchfield.com on Nov. 27, 2006, 2 pages.
Statement regarding technology, 1998.
Advisory Action for U.S. Appl. No. 09/979,199, dated Jul. 9, 2004, 3 pages.
Amendment and Reply for U.S. Appl. No. 10/127,982, dated Aug. 25, 2004, 17 pages.
Amendment and Reply for U.S. Appl. No. 09/979,199, dated Jan. 8, 2004, 10 pages.
Amendment and Reply for U.S. Appl. No. 09/979,199, dated Jun. 7, 2004, 10 pages.
Communication Pursuant to Article 96(2) EPC regarding European Patent Application No. 00939377.8, dated Apr. 25, 2003, 6 pages.
Minutes of the Oral Proceedings for European Patent Application No. 00 939 377.8, dated Sep. 14, 2007, 29 pages.
Notice of Allowance for U.S. Appl. No. 09/979,199, dated Mar. 23, 2007, 6 pages.
Notice of Allowance for U.S. Appl. No. 10/127,982, dated Jul. 16, 2007, 6 pages.
Notice of Allowance for U.S. Appl. No. 10/127,982, dated Oct. 25, 2007, 4 pages.
Notice of Allowance for U.S. Appl. No. 10/336,466, dated Oct. 2, 2007, 4 pages.
Notice of Allowance for U.S. Appl. No. 11/517,946, dated Nov. 16, 2009, 4 pages.
Office Action for U.S. Appl. No. 09/979,199, dated Apr. 7, 2004, 14 pages.
Office Action for U.S. Appl. No. 09/979,199, dated Dec. 2, 2004, 13 pages.
Office Action for U.S. Appl. No. 09/979,199, dated Dec. 23, 2005, 14 pages.
Office Action for U.S. Appl. No. 09/979,199, dated Mar. 7, 2007, 4 pages.
Office Action for U.S. Appl. No. 09/979,199, dated Oct. 8, 2003, 11 pages.
Office Action for U.S. Appl. No. 10/127,982, dated Feb. 25, 2004, 19 pages.
Office Action for U.S. Appl. No. 10/127,982, dated Jul. 10, 2006, 14 pages.
Office Action for U.S. Appl. No. 10/127,982, dated Nov. 17, 2005, 8 pages.
Office Action for U.S. Appl. No. 10/326,620, dated Sep. 28, 2004, 18 pages.

Office Action for U.S. Appl. No. 10/336,466, dated Jul. 3, 2006, 16 pages.
Office Action for U.S. Appl. No. 10/364,794, dated Sep. 28, 2004, 14 pages.
Office Action for U.S. Appl. No. 10/371,802, dated Jun. 23, 2005, 15 pages.
Office Action for U.S. Appl. No. 11/517,946, dated Nov. 27, 2007, 10 pages.
Request for Continued Examination (RCE) Amendment and Reply for U.S. Appl. No. 09/979,199, dated Aug. 9, 2004, 12 pages.

Search Report for European Patent Application No. 02076747, dated Aug. 29, 2003, 3 pages.
Lind et al., The Network Vehicle—A Glimpse into the Future of Mobile Multi-Media, Digital Avionics Systems Conference, IEEE, 1998, 8 pages.
Search Report for European Patent Application No. 07013479.6, dated Mar. 1, 2011, 11 pages.

* cited by examiner

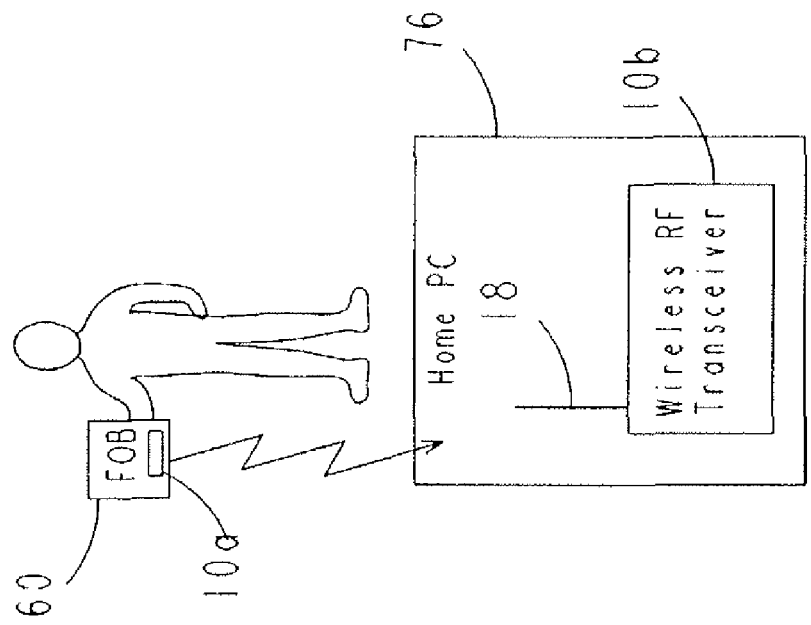
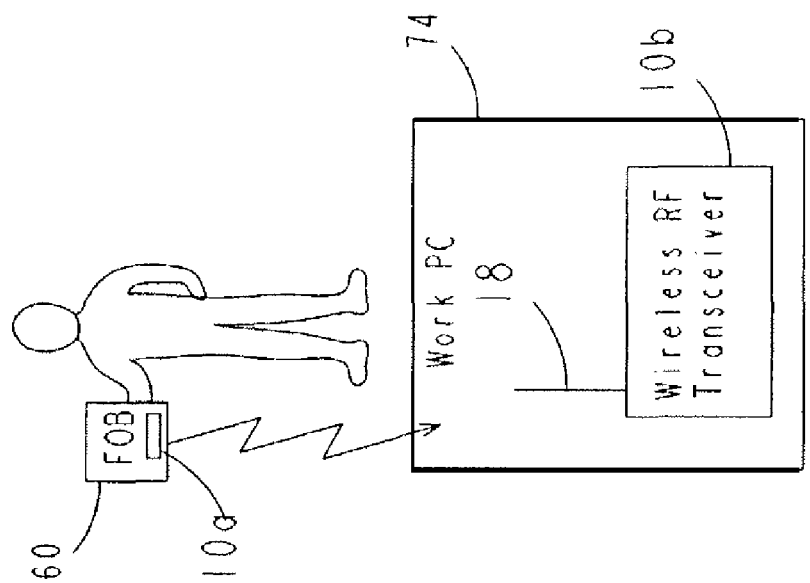

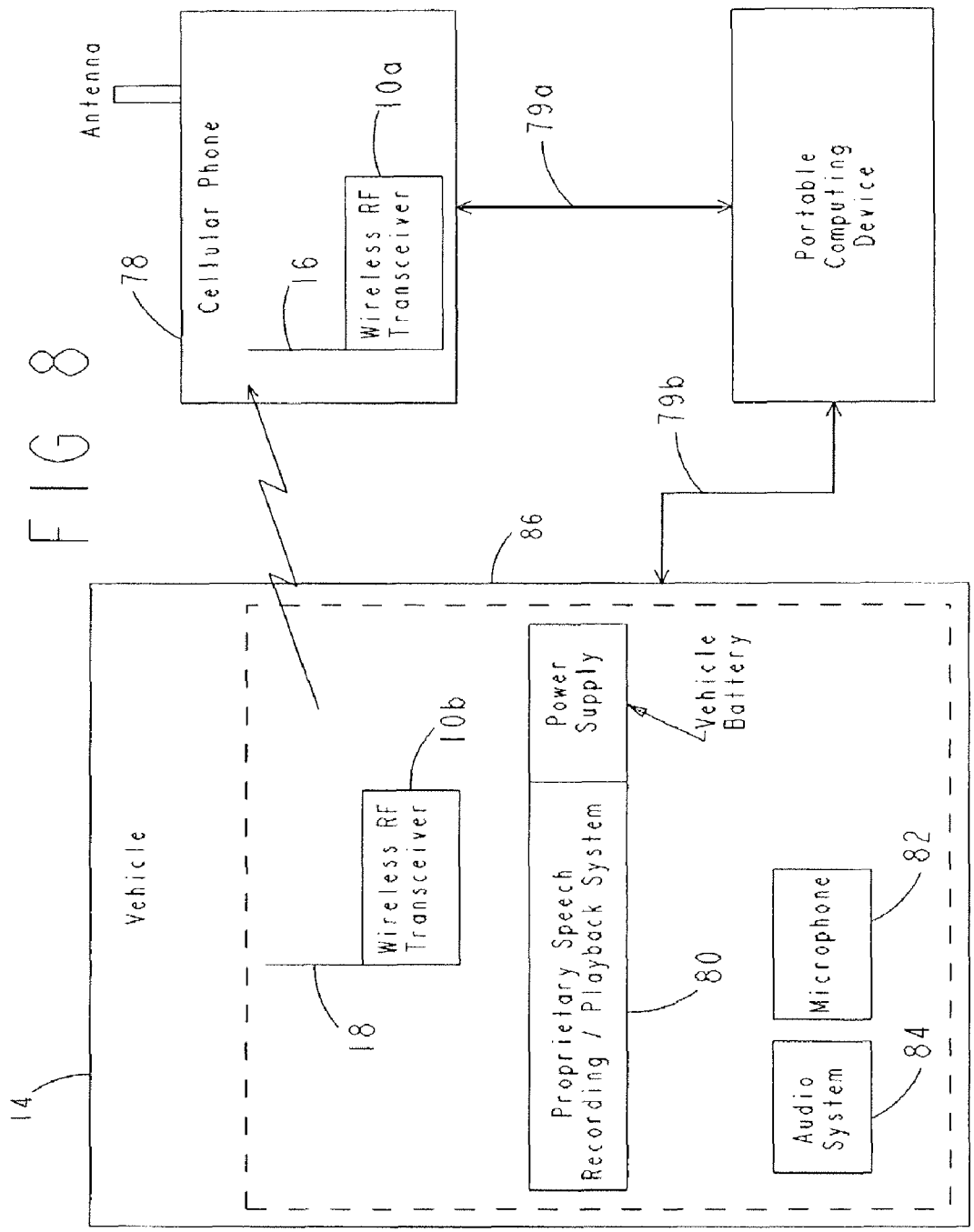

WIRELESS CONTROL SYSTEM AND METHOD

CROSS REFERENCE TO RELATED APPLICATIONS

This application is a continuation of and claims benefit to prior U.S. application Ser. No. 10/336,466, filed Jan. 3, 2003, now U.S. Pat. No. 7,346,374, which is a continuation-in-part of Ser. No. 09/979,199, having a 371(c) date of Apr. 29, 2002, now U.S. Pat. No. 7,257,426, which was a national stage of International Application No. PCT/US00/14692, filed May 26, 2000, which claims the benefit of U.S. Provisional Application No. 60/135,979, filed May 26, 1999. The entirety of application Ser. No. 10/336,466 is hereby incorporated by reference. The entirety of U.S. application Ser. No. 09,979, 199, International Application No. PCT/US00/14692, and Provisional Application No. 60/135,979 are also incorporated by reference.

BACKGROUND

This invention relates generally to wireless communications devices, and more particularly to a wireless communications system and method which facilitates an automatic wireless connection and wireless communication of voice and/or data information between various electronic components such as notebook computers, cellular telephones, hand held computing devices, pagers, audio devices, display terminals and other electronic systems.

With the increasing popularity of various personal electronic information and computing devices, there has been an increasing need to conveniently integrate the operation, and more specifically the transfer of information, between one or more of such devices. These electronic devices may include portable computing devices such as notebook computers or personal digital assistants ("PDAs"), such as a hand held computing devices, desktop computers, cellular phones, pagers, audio systems, display devices, cordless headsets, digital cameras and virtually any other electronic or electromechanical device that uses electronic information for its operation.

In many environments, such as within an automobile, it would be desirable to be able to communicate voice and/or data in wireless fashion between various subsystems of the vehicle, such as an overhead display subsystem of the vehicle, a cellular phone, notebook computer, PDA, pager or other personal electronic device which is carried on the person of an individual. The ability to transfer information between various subsystems of the vehicle and the user's personal electronic devices, in wireless fashion, would increase the ease and convenience of use of such personal devices when travelling in the vehicle.

Until the present, transferring information between one or more of these devices has most often required that cabling be connected between the devices. Usually the cabling is "application specific", meaning that the cabling used to connect, for example, a notebook computer and a hand-held PDA, is specifically designed for only these two components. Thus, the same communications cabling needed for connecting two specific electronic components often can only be used to connect those two components, and not to connect different combinations of other electronic components. Thus, interconnecting different combinations of electronic devices for intercommunication is often possible only with specific and often expensive cabling.

Communication between more than two electronic devices at one time via cabling presents even greater difficulty. Usually some form of hub or "T" connector, together with a mechanical switch and a suitable plurality of external cables is needed. Thus, the user often has very limited flexibility in linking more than two electronic devices together for communication.

In certain environments, such as within an automobile, it is often impractical for the user to manually connect and disconnect cabling between two or more electronic devices, especially when the electronic devices are portable devices which the user desires to carry when leaving the vehicle. Additionally, it would be impractical to attempt to connect such personal electronic devices to existing subsystems of a vehicle, such as an overhead display console, with physical cables that would be loose within the vehicle. Such cabling could easily interfere with the driver's convenient operation of the various controls of the vehicle or with the comfort and convenience of other passengers in the vehicle.

Radio frequency data communication has traditionally been hampered by the lack of a standard communications protocol for data transfer which permits data to be transmitted between two or more independent electronic devices. A further limitation with RF data transfer systems has been the lack of a low cost, low power RF transceiver able to be inexpensively integrated with compact, portable electronic devices such as notebook computers, cellular telephones, hand-held PDAs, pagers, etc., to enable convenient RF information transfer between two or more of such devices over short distances of up to, for example, about ten meters.

Still another limitation with traditional methods for transmitting data between electronic devices has been the lack of an "automatic" or "unconscious" connection when the devices are in proximity with one another. By "automatic" or "unconscious" it is meant an immediate communications link which is established between two or more electronic devices as soon as the devices are within a certain range, for example, ten meters, of each other without any command being input to any of the devices by the user. This limitation has up until the present required the user to provide one or more commands to at least one of the electronic devices to begin the process of transferring data between the two devices.

In view of the foregoing, it would therefore be desirable to provide a wireless communications system adapted for use in automotive applications to permit the wireless exchange of voice and/or data between various portable electronic devices and various electronic subsystems of a motor vehicle. Such a system would preferably include a first electronic component which could be readily integrated with a wide variety of electronic devices such as notebook computers, pagers, PDAs, cellular phones, etc., and a second component which could easily be integrated with various electronic subsystems of a motor vehicle such as an audio system, microphone, in-dash or overhead display system, on-board navigation system, etc. The first and second components would also preferably be extremely compact, lightweight, have low power requirements, and would therefore be very easily integrated into the various portable electronic devices described above, as well as into the various electronic subsystems of the vehicle. The components would preferably be able to automatically establish a wireless communications link as soon as the electronic device incorporating the first component comes into proximity with the vehicle, where the vehicle incorporates the second component. Such a system would obviate the need for any external cables to be attached between the electronic device(s) and the subsystem(s) of the vehicle.

Another example of an application where such a system would be highly useful is in the manufacturing of an automobile. If pertinent information concerning one or more of the vehicle's components or electronic subsystems could be quickly and automatically accessed and transmitted, via a high speed wireless communications link, to an electronic diagnostic/verification test system stationed along side an assembly line on which the vehicle is moving, then real time verification tests could be performed on the various electronic subsystems of the vehicle as it being manufactured. Such automatically created wireless communications links would significantly enhance a wide range of other applications.

Furthermore, it would be desirable if such a wireless communications system could be provided which does not add appreciably to the overall costs of such portable electronic devices or to the costs of various electronic subsystems of the vehicle. Preferably, the system would provide a manner of transmission that also ensures very secure wireless transmissions to limit the possibility of the devices being susceptible to electronic "eavesdropping" or the data being intercepted by other RF devices operating in the same frequency spectrum.

SUMMARY

According to an exemplary embodiment, a system for communicating information is described. The system comprises a radio frequency (RF) transceiver coupled to a vehicle. The transceiver is configured to communicate with a personal digital assistant (PDA) located external to the transceiver using wireless RF signals to transmit information between the transceiver and the PDA.

According to another exemplary embodiment, a system for communicating information is described. The system comprises a radio frequency (RF) transceiver coupled to a vehicle. The transceiver communicates with a portable computing device located external to the transceiver using wireless RF signals to transmit information between the transceiver and the portable computing device.

According to yet another exemplary embodiment, a method for communicating information is described. The method comprises communicating information between a transceiver coupled to a vehicle and a personal digital assistant (PDA) located external to the transceiver using RF signals.

BRIEF DESCRIPTION OF THE DRAWINGS

The various advantages will become apparent to one skilled in the art by reading the following specification and by referencing the following drawings in which:

FIG. 6 is a block diagram drawing illustrating a wireless communications link created between a key fob carried by the user and a work PC to enable data files to be transmitted in wireless fashion between the PC and the key fob;

FIG. 7 is a block diagram of the key fob of FIGS. 5 and 5A being used to transmit files in wireless fashion from the key fob to a home PC;

FIG. 8 is a block diagram according to an exemplary embodiment being used to create a wireless communications link between a cellular phone and a proprietary voice recording/playback system manufactured by the assignee of the present application and presently used on motor vehicles;

DETAILED DESCRIPTION OF EXEMPLARY EMBODIMENTS

Figure 1:
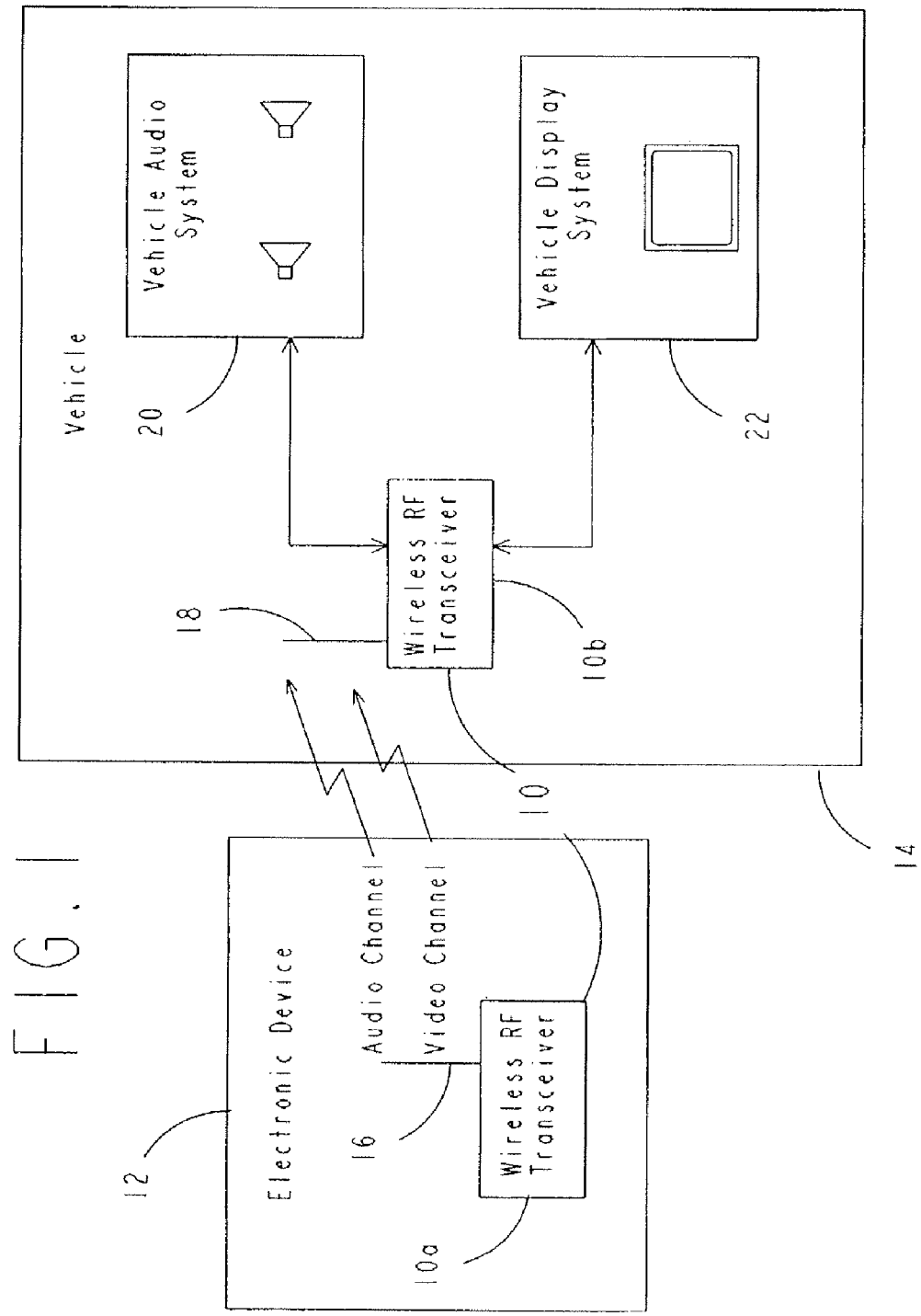
FIG. 1 is a block diagram drawing of a wireless communications system in accordance with an exemplary embodiment being used to transfer information between an electronic device of the user and an audio system and a display system of a motor vehicle.

According to an exemplary embodiment, a system for communicating information includes a vehicle interface system configured to receive vehicle system information from a vehicle system and a trainable transceiver coupled to a vehicle. The trainable transceiver can be configured to receive the vehicle system information through the vehicle interface system. The trainable transceiver can be further configured to wirelessly communicate with a first electronic device located external to the trainable transceiver to transmit the vehicle system information between the trainable transceiver and the first electronic device.

According to another exemplary embodiment, a system for enabling wireless information transfer includes a first electronic device mounted in a vehicle, a second electronic device located external to the first electronic device, and a trainable transceiver located external to the first electronic device. The trainable transceiver is configured to wirelessly communicate information between the first and second electronic devices.

According to another exemplary embodiment, a method for communicating information includes receiving vehicle system information through a vehicle interface system and wirelessly communicating the vehicle system information between a trainable transceiver coupled to a vehicle and an electronic device located external to the trainable transceiver.

According to another exemplary embodiment, a method for wirelessly transferring information includes receiving electronic information at a first electronic device, the first electronic device including a first transceiver, and wirelessly transmitting the electronic information from the first electronic device to a second electronic device, the second device including a second transceiver. At least one of the first and second electronic devices is positioned within an automobile and the transceiver of the device positioned within the automobile is trainable. The electronic information is transmitted from the first electronic device to the second electronic device.

An exemplary embodiment is directed broadly to a wireless communications system and method for transmitting information between two or more electronic devices. In one exemplary embodiment a miniature RF transceiver is integrated into each electronic device. The RF transceivers are low power, short range transceivers that enable the exchange of voice and/or data information between the two devices. The wireless communications link between the devices is established automatically when the devices come within a predetermined proximity to each other. Thus, information can be transmitted automatically from one device to the other without any action from an individual monitoring or possessing one of the devices and without the user having to connect one or more external cables between the devices.

In one exemplary embodiment, a wireless communication system makes use of the Bluetooth communications standard for establishing a wireless communications link between two devices, where each device is equipped with a RF transceiver operating in accordance with the Bluetooth communications standard. This enables two or more devices to be connected via high speed, wireless communications links to permit voice and/or data information to be exchanged between the various devices. The devices communicate on the 2.4 GHz ISM frequency band and employ encryption and authentication schemes, in addition to frequency hopping, to provide a high measure of security to the transmission of data between the devices. Advantageously, the wireless communications link is created automatically as soon as the two devices come into proximity with each other.

In some exemplary embodiments, the RF transceivers each comprise low power components providing a limited range of up to about 100 meters. Each RF transceiver has a negligible power consumption, as compared with the device with which it is integrated. Each RF transceiver can automatically form ad hoc communications links with other RF transceivers passing within the predetermined transmission range.

The various exemplary embodiments enable voice and/or data information to be transmitted between a wide variety of devices without any command or intervention by the user. The exemplary embodiments lend themselves especially well to applications involving the transfer of information between various portable electronic devices and the various electronic subsystems of a motor vehicle. The exemplary embodiments further enable the transfer of information between a motor vehicle and other electronic systems outside of the vehicle, which makes the embodiments ideally suited to applications involving assembly of the vehicle, assisting in transmitting diagnostic information to and from a vehicle, and a wide variety of other applications where it is desirable to transmit information to a user traveling in a motor vehicle.

The various exemplary embodiments are also ideally suited to establishing wireless communications links for a wide variety of other home, business, and commercial applications. A wide variety of electronic devices can thus be networked together for information sharing.

Referring to FIG. 1, a wireless communications system 10 in accordance with an exemplary embodiment is illustrated. The exemplary embodiment is broadly directed to a wireless communications system 10 in which at least one pair of RF transceivers 10a and 10b are used to create a wireless communications link between at least two independent electronic devices. Each RF transceiver 10a and 10b operates in accordance with a suitable wireless communications protocol or standard to enable wireless communications between the transceivers 10a and 10b. The specific protocol or standard used also preferably enables the wireless communications link to be established automatically when the two RF transceivers come into proximity with each other. The specific protocol or standard may be the Bluetooth communications standard or the Shared Wireless Access Protocol-Cordless Access (SWAP-CA) specification, or any other suitable wireless communications specification that enables voice and/or data information to be transmitted between the two RF transceivers 10a and 10b.

The Bluetooth communications standard was established for creating small form factor, low-cost, short range RF links between mobile telephones, notebook computers, PDAs and other portable electronic devices. It is the result of a joint effort between several major commercial organizations to develop a RF communications standard for creating secure, wireless communications links between portable electronic devices such as cellular phones, PDAs, computers and other electronic devices. The Bluetooth communications standard is presently an "open" standard that enables short range, secure, RF transmission of voice and/or data information between such portable electronic devices to thus eliminate the need for physical cables for interconnecting the devices. Its implementation is based on a high performance, but low cost, integrated RF transceiver chip set. The Bluetooth standard further provides the potential for automatic and rapid "ad hoc" wireless connections when two or more devices equipped with RF transceivers operating in accordance with the Bluetooth standard come into proximity with each other.

The Bluetooth standard makes use of the free, universal 2.4 GHz Industrial, Scientific, and Medical (ISM) band and a frequency hopping scheme using 1600 hops/second. Encryption and authentication are built into the Bluetooth standard along with an automatic "output power adaption" feature that automatically reduces the output power of the RF transceiver to only (and exactly) that amount of power which is needed to accomplish the data transmission.

The Bluetooth standard specifies a minimum RF receiver sensitivity of −70 dBm and the nominal output power is specified as 0 dBm (i.e., 1 mW), which eliminates the need for an off-chip power amplifier. With a 0 dBm transmit power, the typical range for the RF transceiver is up to about 10 meters. The range can be extended to about 100 meters by augmenting the RF transceiver chip set with an external power amplifier to increase the transmit power to a maximum of 20 dBm. The maximum data transfer rate between two Bluetooth transceivers is slightly under 1 Mbits/sec. The data rate for a voice channel is 64 kbits/sec (GSM-13 kbits/sec). A suitable RF transceiver for use with the Bluetooth standard can be formed relatively inexpensively as a single CMOS integrated chip. As such, the RF transceiver can be manufactured sufficiently small such that it can be readily incorporated into virtually all portable electronic devices without adding appreciably to the size, cost, weight and power consumption of such devices. Additional information on the Bluetooth standard can be obtained at URL address www.bluetooth.com.

Advantageously, the Bluetooth standard presently supports wireless communications networks termed "piconets" of between two to eight devices actively communicating with each other. Additional devices can be "parked" and accessed as needed. Within a piconet, one of the devices acts as the "master" device, which determines the frequency hopping pattern, packet timing, and which coordinates transmissions to the other "slave" devices. The slave devices can also be members of more than one piconet at a time, thus forming an ad hoc arrangement of multiple piconets termed a "scatternet". Thus, networked communication of notebook computers, PDAs, mobile phones, and other devices are provided for with the Bluetooth standard.

The SWAP-CA specification is another wireless communications standard that potentially could be employed by the RF transceivers 10a and 10b. The SWAP-CA specification also is intended to use integrated transceivers on a 2.4 GHz frequency hopping scheme for wireless communications between various products and appliances used in homes. With this standard, the data transfer rate for information is 2 Mbits/sec.

Accordingly, while the Bluetooth or SWAP-CA specifications may be referenced throughout the discussion of the various exemplary embodiments, the exemplary embodiment should be understood as not being limited to the use of one or the other of these specifications, or necessarily to any specific communications specification.

Although RF transmitters are described in several embodiments, it is understood that any type of wireless transmitter can be us to transmit a wireless signal. Examples can include infrared transmitters, sound transmitters, visible light transmitters, etc.

In FIG. 1, one RF transceiver 10a is integrated into a first electronic device 12 while the other RF transceiver 10b is disposed within a motor vehicle 14. The electronic device 12 may comprise a notebook computer, a hand-held PDA, a cellular phone, a pager, or any other portable electronic component. The first RF transceiver 10a includes an antenna 16 for enabling two way communications with the RF transceiver 10a. Likewise, the second RF transceiver 10b also includes its own antenna 18 for enabling two way communications. The vehicle 14 typically includes an audio system 20 and a display system 22. The display system 22 may be mounted-in a dashboard or instrument panel, an overhead console, a floor mounted console, a visor, a rear view mirror or at a wide variety of other locations inside the vehicle 14. The display 22 may comprise a small cathode ray tube ("CRT"), a liquid crystal display ("LCD") or various other forms of displays which are easily visible in daytime as well as nighttime driving conditions.

Each of the RF transceivers 10a and 10b are preferably formed as integrated circuit components which have an extremely low power consumption relative to the device with which they are integrated. Accordingly, the RF transceivers 10a and 10b can be maintained in an "on" state even when the electronic device with which it is associated is turned off. The RF transceivers 10a and 10b are further extremely compact and relatively inexpensive such that the overall dimensions of the electronic device are not appreciably increased by the inclusion of one of the transceivers 10a or 10b, and further such that the overall cost of the electronic device does not increase appreciably.

In FIG. 1, when the electronic device 12 comes into the vicinity of the vehicle 14, a high speed, automatic, wireless data link is created between the two RF transceivers 10a and 10b. The required proximity will vary depending upon the power output of each transceiver 10a and 10b. For a 0 dBm (1 mW) power output, a transmission range of up to about 10 meters is provided. Providing a suitable external amplifier to increase the output power of each RF transceiver 10a or 10b to a maximum of 20 dBm will increase the transmission range up to about 100 meters. It will be appreciated, however, that with even greater power amplifiers an even greater transmission range can be expected. Currently, the Bluetooth standard identifies a 20 dIBm maximum power output. Accordingly, the transmission range allows electronic device 12 to be outside the vehicle, meaning not within the passenger compartment and/or not within any compartment of the vehicle.

Once the wireless communications link is established between the two RF transceivers 10a and 10b, information from the electronic device 12 can be transmitted to transceiver 10b and then output to the vehicle's audio system 20 and/or to the display system 22. Thus, the user is not required to type in or otherwise give any commands to the electronic device 12 before the wireless communications link is established. Once established, the communications link enables information from the electronic device 12 to be automatically transmitted via RF transceiver 10a to the receiving RF transceiver 10b. In this manner, a wide variety of useful information such as personal calendars, e-mail messages, telephone directories, and virtually any other form of text information can be displayed on the vehicle's display system 22. If an external "text-to-speech" module is incorporated for operation with the second RF transceiver 10b, then text information can be converted into audio before being transmitted to the vehicle's audio system 20 for playback. Thus, if the electronic device 12 comprises a notebook computer with a CD player, any information available on the CD can potentially be converted to speech via the external text-to-speech module and the vehicle's audio system 20. Thus, a wide variety of CD-based or Internet-based audio material such as books, educational materials, etc. could be played over the vehicle's audio system 20 while the user is in the vehicle 14.

Figure 2:
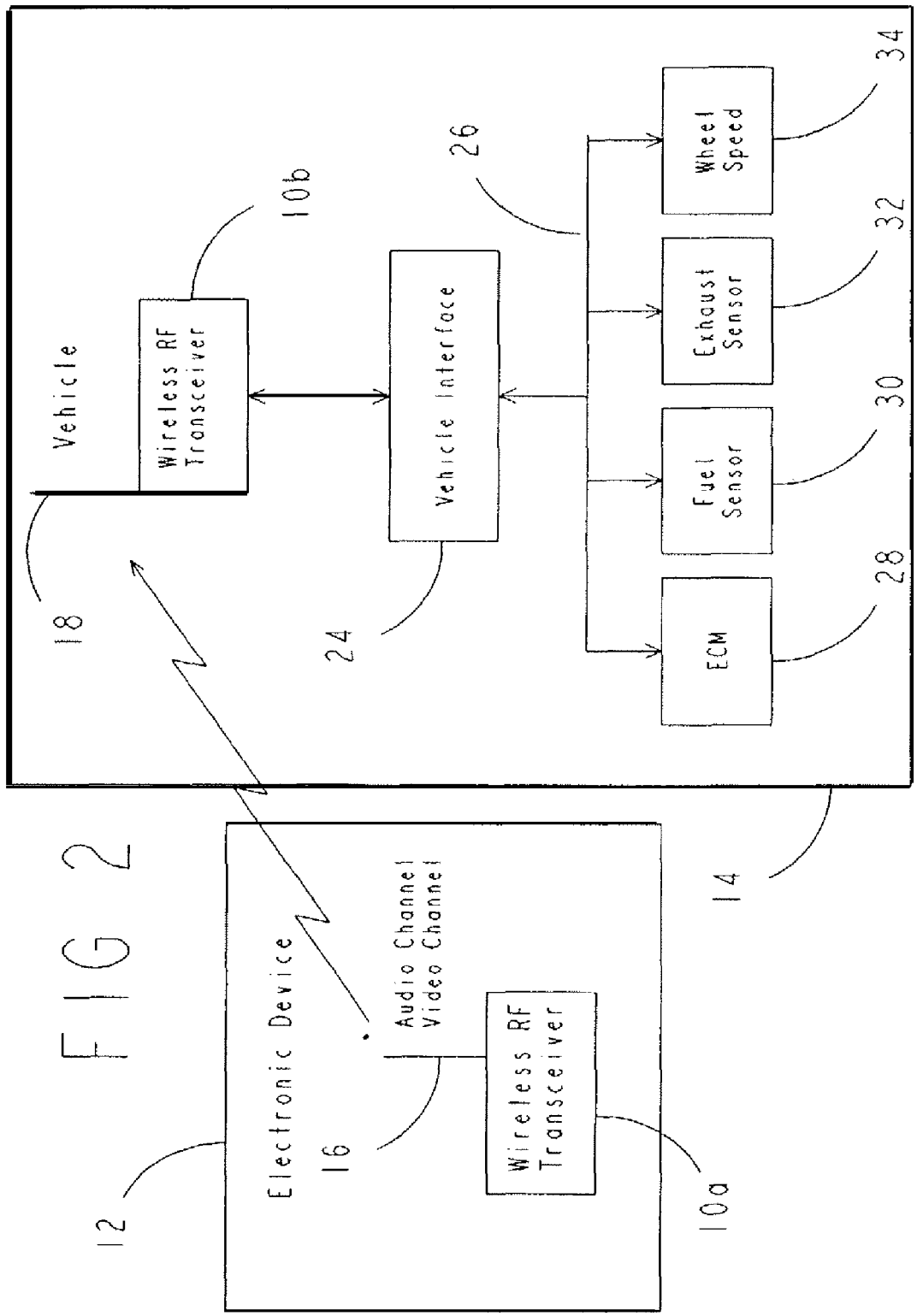
FIG. 2 is a block diagram illustrating a wireless communications system being used to perform vehicle diagnostics on a motor vehicle by creating a wireless communications link between a notebook computer running diagnostics software and a vehicle interface circuit associated with a motor vehicle.

Referring to FIG. 2, another implementation of the wireless communications system 10 is shown. This implementation is used to facilitate performing diagnostics on a motor vehicle 14 via the electronic device 12. In this example, the electronic device may comprise a notebook computer or other electronic instrument loaded with diagnostic software specifically suited to the vehicle being tested. The first RF transceiver 10a is integrated into the electronic device 12 and the second RF transceiver 10b is integrated for communications with a vehicle interface system 24. The vehicle interface system 24 is in turn configured for two way communications via a data bus 26 with various electronic subsystems of the vehicle 14 such as the vehicle's Electronic Control Module (ECM) 28, a fuel sensor 30, an exhaust sensor 32, a wheel speed sensor 34 or virtually any other form of sensor which provides an electronic output signal related to its operation.

The wireless data link may be created automatically as soon as the vehicle 14 enters a service bay or other designated service area. The first RF transceiver 10a automatically begins transmitting diagnostics information or vehicle system information stored in an associated memory (not shown) to the second RF transceiver 10b to begin the diagnostics testing. Information transmitted can include any stored information that would be useful in assessing performance for any system associated with the vehicle. Information is transmitted back to the first transceiver 10a by the second transceiver 10b as information is received from the vehicle interface 24 from each of the sensors/components 28-34 under test. This information is then used by service personnel to determine the operational status of each of the sensors/components 28-34 on-board the vehicle 14. While the electronic device 12 has been described as a notebook computer, it will also be appreciated that the device 12 could just as readily comprise a personal computer or other form of computer adapted to run the diagnostics software.

It will be appreciated that the automatic wireless communications link enables various diagnostics to be performed on a motor vehicle even while other operations, for example, an oil change, are being performed simultaneously with the running of the diagnostics. This implementation can significantly reduce the manpower required to perform various service-related operations on a motor vehicle as well as decrease the length of time needed to perform a full service checkup/tune-up on a vehicle when the vehicle is brought in for routine maintenance such as oil changes, wheel alignments, air and fuel filter changes, wheel balancing, etc.

Figure 3:
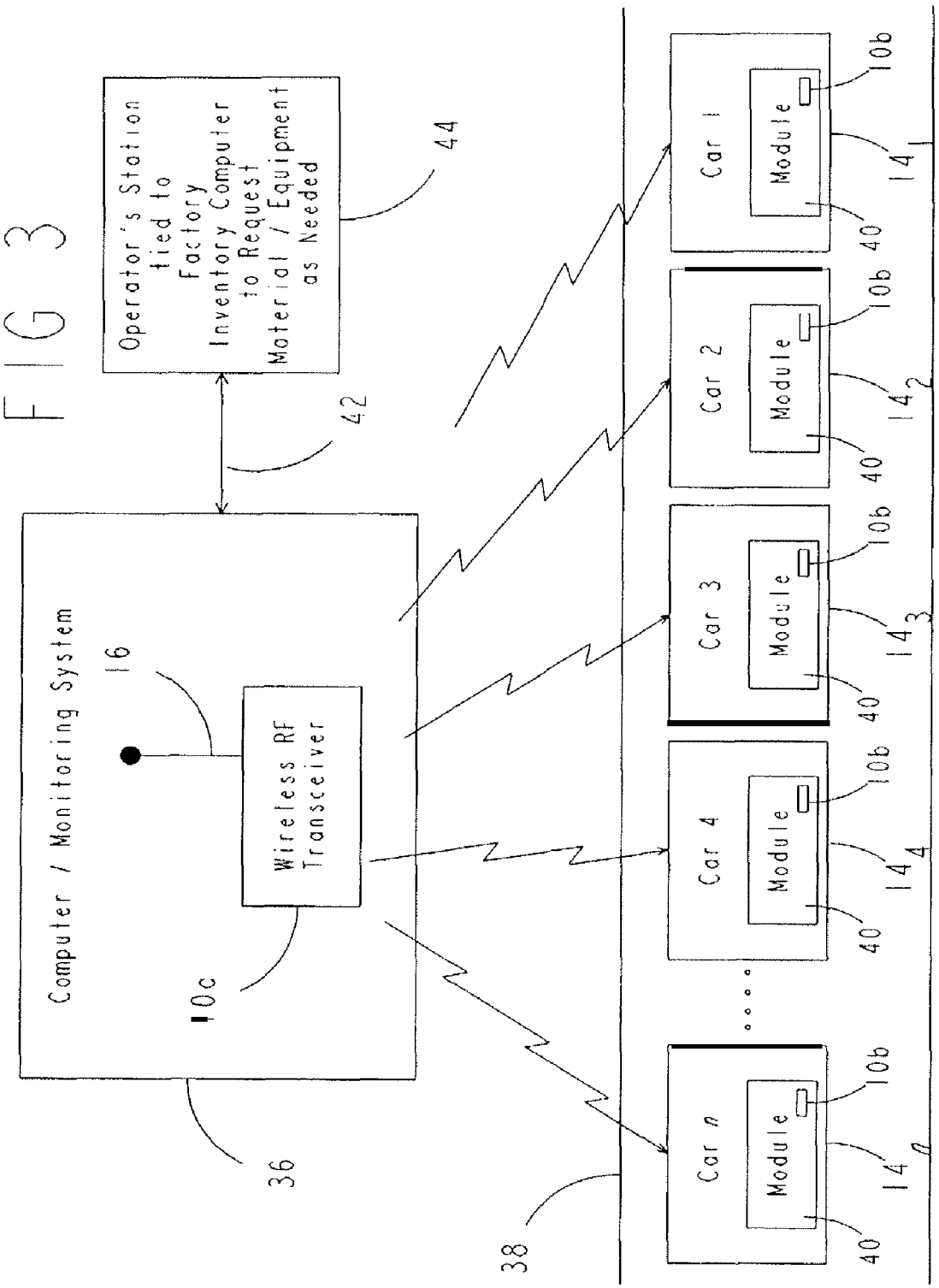
FIG. 3 is a block diagram of a wireless communications system being used in an assembly operation in which information is transmitted from RF transceivers located in each vehicle to an assembly line monitoring system such that information needed for the manufacture of each vehicle can be requested in advance and thereafter made ready as needed during assembly of the vehicle.

Referring now to FIG. 3, an implementation of the wireless communications system 10 is shown being used in the assembly process of a motor vehicle. In this implementation, the first RF transceiver 10a of the system 10 is integrated with an assembly line computer/monitoring system 36. Each one of a plurality of vehicles $14_1$-$14_n$, traveling on assembly line conveyor 38 includes a module 40 having the second RF transceiver 10b integrated therewith. The module 40 can be programmed to include information regarding the specific options that its associated vehicle 14 is to include. Such options could comprise the type of interior, audio system options, interior trim package, powertrain options or any other equipment that will be needed to complete the manufacture of that particular vehicle 14.

As each vehicle $14_1$-$14_n$, moves along the assembly line conveyor 38 into proximity with the computer/monitoring system 36, an automatic wireless communications link is established between each RF transceiver 10b, one at a time, and the RF transceiver 10a of the computer monitoring system 36. Information regarding the options that each particular vehicle $14_1$-$14_n$, is then transmitted via the wireless communications link to the computer/monitoring system 36, which in turn is transmitted over a communications link 42 to an inventory management computer 44. It will be appreciated that the communications link 42 could be a wire-based link or could even be formed by an additional pair of RF transceivers in accordance with the teachings described herein to form a second wireless link. The only limitation here would be the distance to the inventory computer system 44 from the assembly/monitoring computer system 36.

The above-described implementation enables the wireless communications system 10 to thus be used to synchronize the supply of needed equipment and materials to each vehicle $14_1$-$14_n$, moving on the assembly line conveyor 38 to ensure that exactly the proper equipment is provided for each vehicle.

It will also be appreciated that the implementations described in connection with FIGS. 2 and 3 could be combined to enable various electronic modules and subsystems of the vehicle to be tested immediately as the vehicle moves along the assembly line conveyor 38. This feature would enable a vehicle diagnostics computer located adjacent to the assembly line conveyor 38 to run tests on the vehicle's modules and electronic subsystems to detect defective components before the vehicle proceeds to the next step of the assembly process. This feature would save the significant costs associated with manually removing various electronic modules and components from the vehicle for testing and repair when a defective component is detected after assembly of the vehicle is complete.

Figure 4:
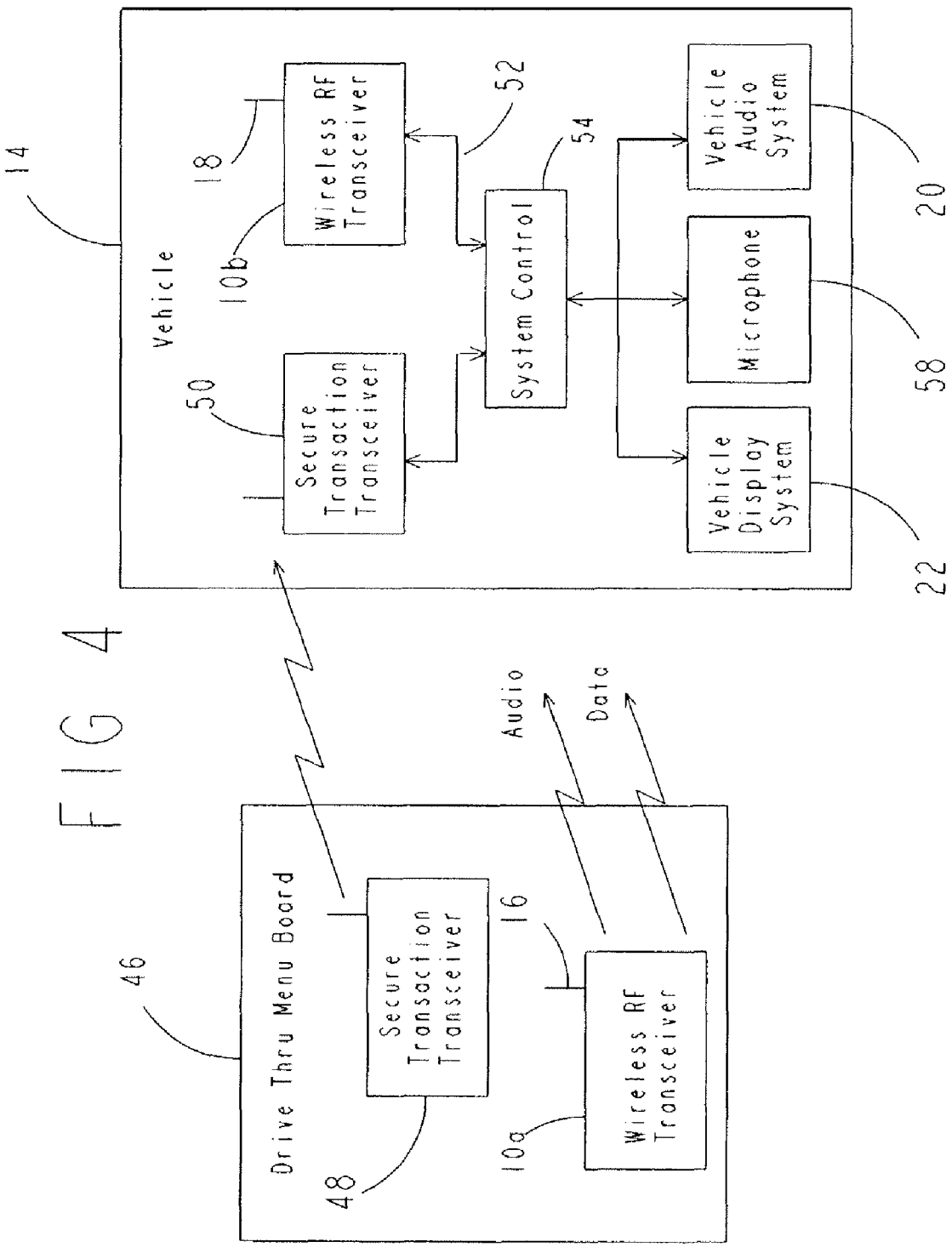
FIG. 4 is a block diagram of a wireless communications system being used to create a high speed data link between a drive-through restaurant menu and the various electronic subsystems of the motor vehicle to enable information from the drive-through menu to be broadcast and/or displayed by the vehicle's electronic subsystems.

Referring now to FIG. 4, yet another implementation of the wireless communications system 10 is illustrated. This implementation is in connection with a retail transaction in which a drive-through menu board 46 has a first RF transceiver 10a of the wireless communications system 10, in addition to a secure transaction RF transceiver 48, integrated therewith. The vehicle includes the second RF transceiver 10b in addition to a secure transaction transceiver 50. As the vehicle 14 approaches the drive-through menu board 46, the RF transceivers 10a and 10b automatically establish a high-speed wireless communications link. A secure datalink is established between transceivers 48 and 50 by which electronic payment can be authorized by the driver of the vehicle 14. Menu information is then automatically downloaded over the high-speed communications link between the RF transceivers 10a and 10b onto a system control device 54. The system control device 54 acts as an interface to transmit the information to the vehicle's display system 22 and/or the vehicle's audio system 20 for playback. If a suitable microphone 58 is coupled to the vehicle 14, authorization for the transaction may be provided verbally by the driver and transmitted via the communications link between the secure transaction transceivers 48 and 50 back to the drive-through menu board 46.

It will be appreciated that the above-described implementation could be modified to enable drive-through banking transactions, drive-through prescription ordering—or a wide variety of other retail transactions made from within a vehicle without the need for the driver to leave the vehicle 14 to effect the transaction. Other applications could include toll collecting, fuel purchases at service stations and other transactions that could potentially be made more conveniently and more quickly by the use of the wireless communications system 10.

Figure 5:
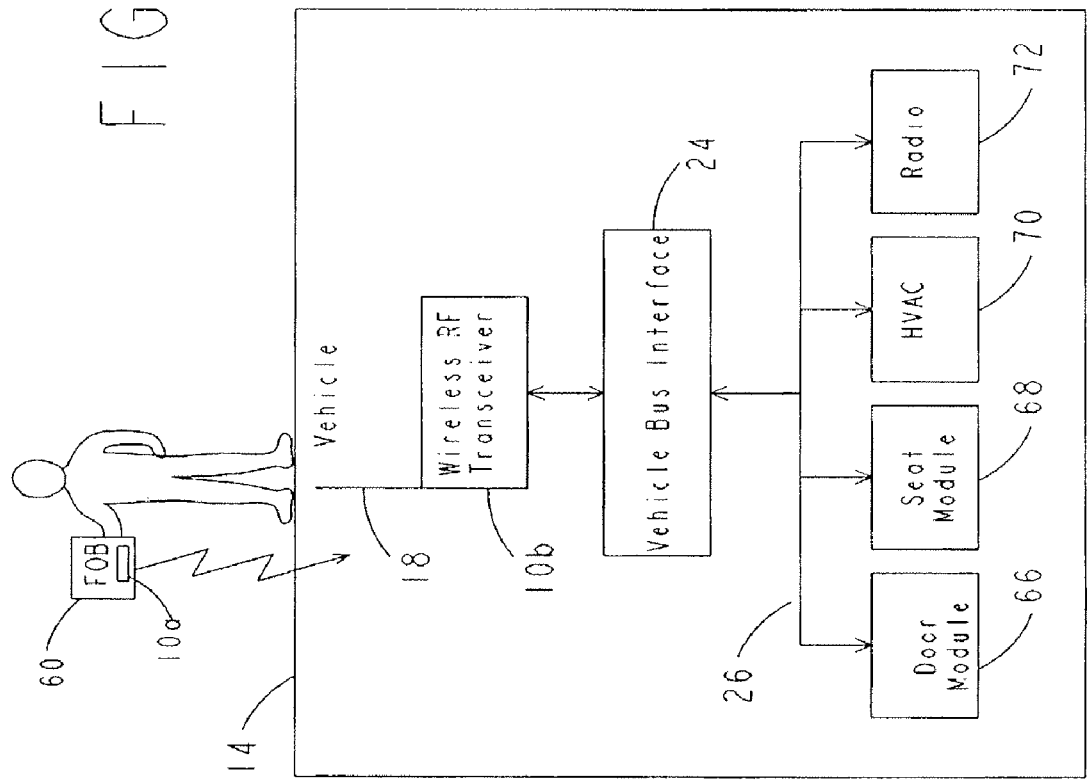
FIG. 5 is a block diagram of a wireless communications system being used in connection with a key fob to enable data to be transmitted from the key fob to a vehicle bus interface of a motor vehicle to control various subsystems of the vehicle.
Figure 5A:
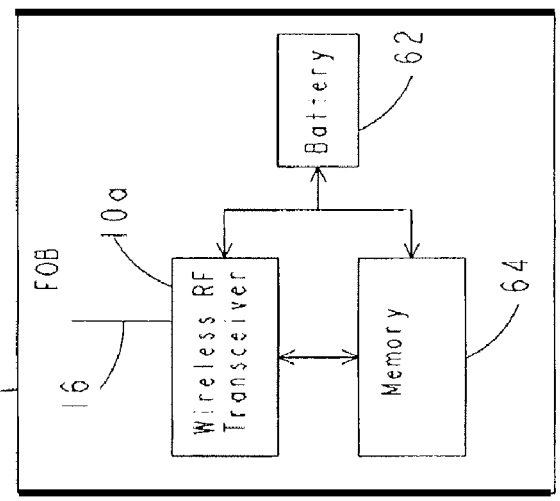
FIG. 5A is a block diagram of the major components of the key fob of FIG. 5.

Referring to FIG. 5, an implementation involving a programmable key fob 60 is illustrated for setting and adjusting various components of the vehicle 14. The key fob 60 is shown in greater detail in FIG. 5A and includes the first RF transceiver 10a of the wireless communications system 10, the antenna 16, a suitable battery 62 for providing power and a suitable memory 64. The second RF transceiver 10b of the system 10 is integrated into the vehicle electronics to communicate with the vehicle bus interface 24 via the vehicle bus 26, and further with various modules 66-72 for controlling various components of the vehicle 14.

As the user approaches the vehicle 14 when carrying the key fob 60, a high speed, wireless communications link is automatically established between the two RF transceivers 10a and 10b. Information stored in the memory 64 of the key fob 60 is then transmitted to the second transceiver 10b and used to control various modules of the vehicle 14 in accordance with preprogrammed settings by the user. Thus, information relating to the precise position of a power seat, volume and channel information of the radio 72, climate control information for the HVAC 70, rearview mirror or external mirror position information, etc., can all be stored in the memory 64 and automatically transmitted to the vehicle 14 as the user approaches the vehicle. The seats of the vehicle 14, climate control settings, radio channel and volume settings, mirror positions, etc. can all be automatically adjusted by suitable vehicle electronics even before the user enters the vehicle 14.

Referring to FIG. 6, another implementation of the wireless communications system 10 using the programmable key fob 60 is illustrated. In this implementation the key fob 60 is used to interrogate a PC 74 at the user's place of business. Selected files stored on the hard drive or in random access memory (RAM) of the PC 74 can be transmitted via a wireless communications link established between the RF transceiver 10a of the key fob 60 and the second RF transceiver 10b, which is integrated with the work PC 74. The information is stored in the memory of the key fob 60 before the user leaves his/her place of business.

Referring to FIG. 7, as the user arrives at his/her home, a home PC 76 is automatically linked with the key fob 60 by the RF transceiver 10a of the key fob 60 and a second RF transceiver 10b integrated with the home PC 76. The automatically created wireless communications link is used to transmit information stored in the memory 64 (FIG. 5a) of the key fob 60 to the individual's home PC 76.

Referring now to FIG. 8, yet another implementation of the wireless communications system 10 is shown in which a cellular phone 78 is linked with a proprietary speech recording/playback system 80 available commercially from the assignee of the present application and marketed under the trademark "Travelnote®". The Travelnote system enables the driver or other vehicle occupant to speak directly into a microphone 82 to record any notes or other information which the user would otherwise write down on paper, but which cannot be accomplished easily while driving the vehicle 14. The notes or other information can be played back from the Travelnote recording/playback system 80 over a speaker 84 once the user reaches his/her destination and prior to exiting the vehicle 14. The Travelnote recording/playback system 80 is described in detail in U.S. Pat. No. 5,810,420, the disclosure of which is hereby incorporated by reference.

In this implementation, the RF transceiver 10a is integrated with the cellular phone 78 and the second RF transceiver 10b is integrated with the Travelnote recording/playback system 80. The Travelnote recording/playback system 80 may be located within a visor or rear view mirror 86. Alternatively, it may be located on the dashboard, overhead console, or any other convenient location within the vehicle 14. The wireless communications system 10 provides a high-speed, wireless communications link between the cellular phone 78 and the Travelnote recording/playback system 80 to enable "hands free" use of the cellular phone 78. Thus, the user need not hold the cellular phone 78 in one hand while driving; the phone 78 can be placed on a console or seat adjacent to the user while the user carries on a hands-free conversation via the microphone 82 and speaker 84 of the Travelnote playback/recording system 80.

A further advantage is that the wireless communications link between the RF transceivers 10a and 10b is created automatically when the cellular phone 78 comes into proximity with the second RF transceiver 10b within the vehicle 14. Thus, the user need only dial a number from the cellular phone 78 to place a call and the conversation thereafter can be conducted via the Travelnote system 80. Alternatively, a call could even be placed via commands and numbers spoken into the microphone 82 and transmitted via the wireless communications link to the cellular phone 78. Useful information received by the cellular phone 78 could even be displayed on a small portion of a rearview mirror. Such information could include auxiliary phone annunciators, a "low battery" warning indicating a low battery power condition for the cellular phone 78 or other incoming call information received via the phone 78.

A modification of this implementation involves modifying the above-described Travelnote system to send and/or receive digital information such that the Travelnote system can be used to pass digital information to and from a computing device 79 such as a hand-held computing device or a laptop computer. With this capability, the Travelnote system could be used to transmit information received by a facsimile transmission or email communications to the computing device. This digital information would be first received by the user's cellular phone 78. Preferably, an infrared communications link 79a is also established by suitable hardware between the cellular phone 78 and the computing device 79. The infrared link is used to transmit digital information between the computing device 79 and the cellular phone 78. Preferably, an infrared link 79b is also established between the Travelnote system and the computing device 79 so that digital information can just as easily be transmitted directly between the computing device 79 and the Travelnote system. Messages sent to the Travelnote system could be stored therein for future downloading to another computer. The computing device 79 could also send stored phone numbers stored to the Travelnote system to simplify the dialing of phone numbers.

As will be appreciated, other implementations can be made in connection with a home and/or vehicle. For example, RF transceiver 10a could be disposed in a cellular phone while RF transceiver 10b is disposed in a HomeLink® system which is proprietary to the assignee of the present application. The HomeLink system can be programmed to interface with, for example, a garage door opener to open the garage door when a control unit of the HomeLink system is actuated by a user. By incorporating RF transceiver 10b into the HomeLink system, the user could enter a predetermined code in the cellular phone which is received by the HomeLink system and which causes the HomeLink system to open the garage door. In this manner, if an individual was not in his/her vehicle as he/she approached their house, the garage door could still be easily opened without the user having the garage door opener unit.

In another implementation, one or more RF transceivers 10a are used in connection with various devices in a home. A second RF transceiver 10b is placed in a garage. The second transceiver 10b serves as a portal from the user's car to those devices in the home that are equipped with RF transceivers 10a. The garage-based RF transceiver 10b is able to interface and interact with those devices incorporating a RF transceiver 10a, such as a home PC, appliances, etc.

In still another implementation, one RF transceiver 10b could be located within a vehicle while a second RF transceiver 10a could be associated with a computer located either at a vehicle dealership or at a home. When a vehicle is manufactured, all parts could be tagged in the plant so it is known which specific parts are installed on the vehicle. This information could be stored in a database stored in a memory device in the car. In addition, warranty information for those parts, as well as for the car as a whole, could be stored in this database.

When the vehicle is in proximity to the first RF transceiver 10a while the vehicle is being serviced at a dealership, service personnel could easily access information stored in the memory device via the wireless link between RF transceivers 10a and 10b. This would provide immediate access to information on the various components of the vehicle, as well as warranty information.

In yet another implementation similar to that described immediately above, only the Vehicle Identification Number ("VIN") is delivered to the computer from the RF transceiver 10b located in the vehicle. The VIN is then used by the computer to access a database which is remote from the vehicle to obtain warranty and part information. It will be appreciated that this information could also be accessed through a web site of the manufacturer of the vehicle.

In still another variation of the above-described implementation, if a cellular telephone is located in the vehicle, and the telephone is equipped with an RF transceiver 10b, then any vehicle malfunctions could be reported to the vehicle manufacturer or dealer via a wireless link established between the computer and the cellular phone. This information can be used to facilitate repair of the vehicle or the tracking of warranty information pertaining to the vehicle.

The computer could also be used to personalize the vehicle operation. For example, the vehicle owner could access a manufacturer's website to select the desired operating parameters for the vehicle. These parameters could include selecting a 12 hour or 24 hour clock time display, establishing station pre-selects for the vehicle radio operation, selecting parameters related to the operation of the vehicle lights, enabling voice interactive messages generated by the vehicle, or a variety of other vehicle operating parameters. Once the operating parameters are selected by the vehicle owner, the website could cause the owner's home computer (which is equipped with RF transceiver 10a) to generate an RF signal that is sensed by the vehicle causing the parameters to be stored in a memory device in the vehicle. Alternatively, a compact disc could be provided to the vehicle owner upon purchase of the vehicle, which can be used with the individual's home computer to personalize the vehicle's functions. This information can then be transferred from the home computer to the vehicle via a wireless link between the two RF transceivers 10a and 10b.

Figure 9:
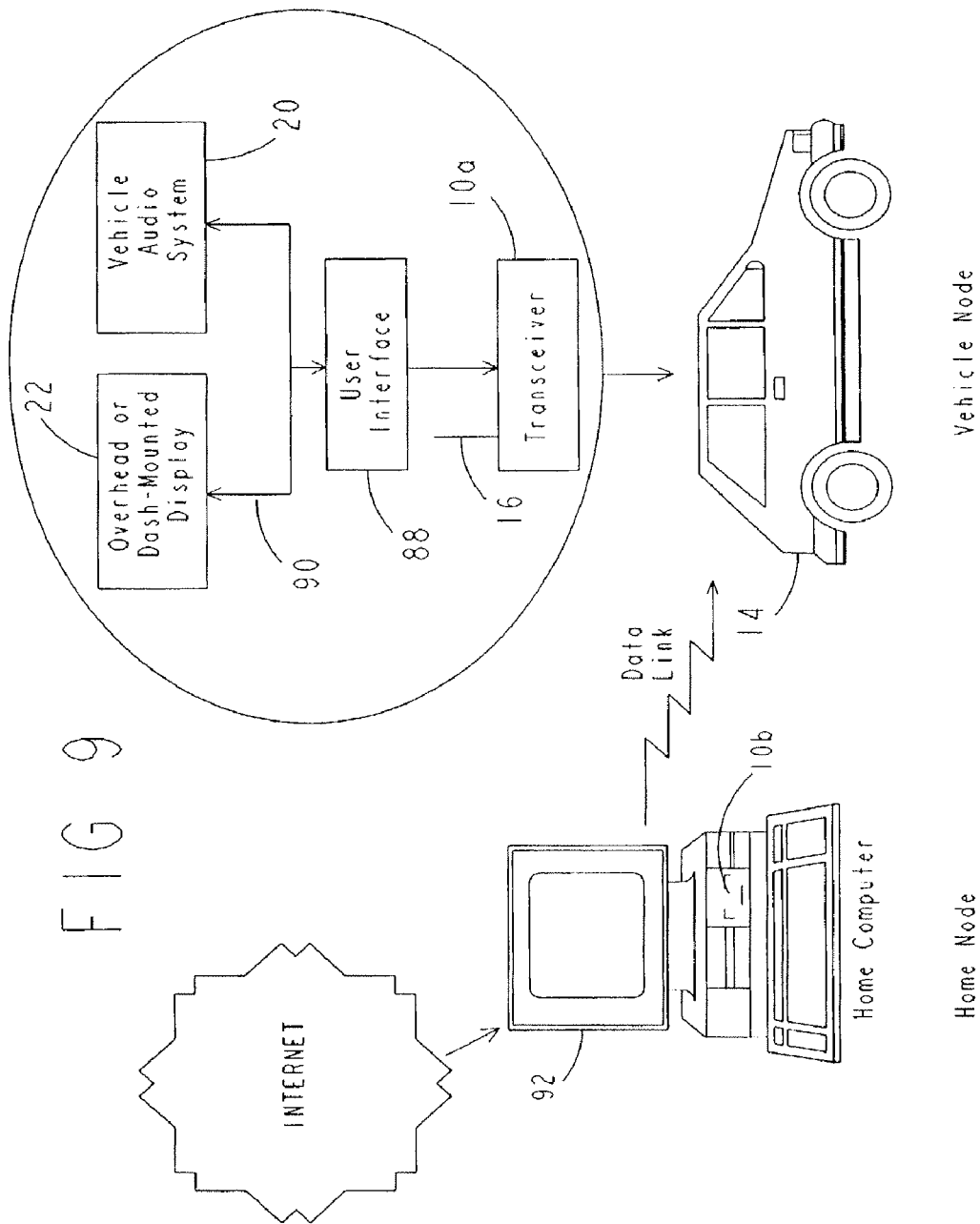
FIG. 9 is a block diagram of a wireless communications system being used to create a wireless data link between a home PC linked to the Internet and various electronic subsystems of a motor vehicle to thereby enable information from the Internet to be transmitted to the subsystems of the vehicle automatically.

Referring to FIG. 9, another implementation of the wireless communications system 10 is shown in which the system 10 includes the first RF transceiver 10a in communication with a user interface circuit 88. The user interface circuit 88 is in turn linked for communication via a suitable bus 90 with a display system 22 and/or an audio system 20 of the vehicle 14. The second RF transceiver 10b is integrated with a home PC 92. The home PC 92 is linked to the Internet.

The user uses the home PC 92 to retrieve information from the Internet (e.g., audio books, news, weather, music, etc.) at a convenient time. Once this information is received by the home PC 92 it is transmitted via the high-speed wireless communications link between the two RF transceivers 10a and 10b automatically. For this to occur, it will be appreciated that the vehicle 14 will need to be parked in the proximate vicinity of the home PC 92 (i.e., within about 100 meters of the home PC 92). In this regard it will also be appreciated that a suitable amount of random access memory (RAM) is provided in association with the display 22 and/or the vehicle audio system 20 for storing the information. The user can then display or play back the information while traveling in the vehicle 14 at the user's convenience. If the data is audio data, then it is played back through the vehicle audio system 20. Even text information which is received may be converted to audio information if a suitable text-to-speech conversion circuit is provided. The information stored could comprise traffic information, daily calendar reminders, appointments or events, e-mail messages, etc., in addition to the book, news, weather and music information mentioned above.

Figure 10:
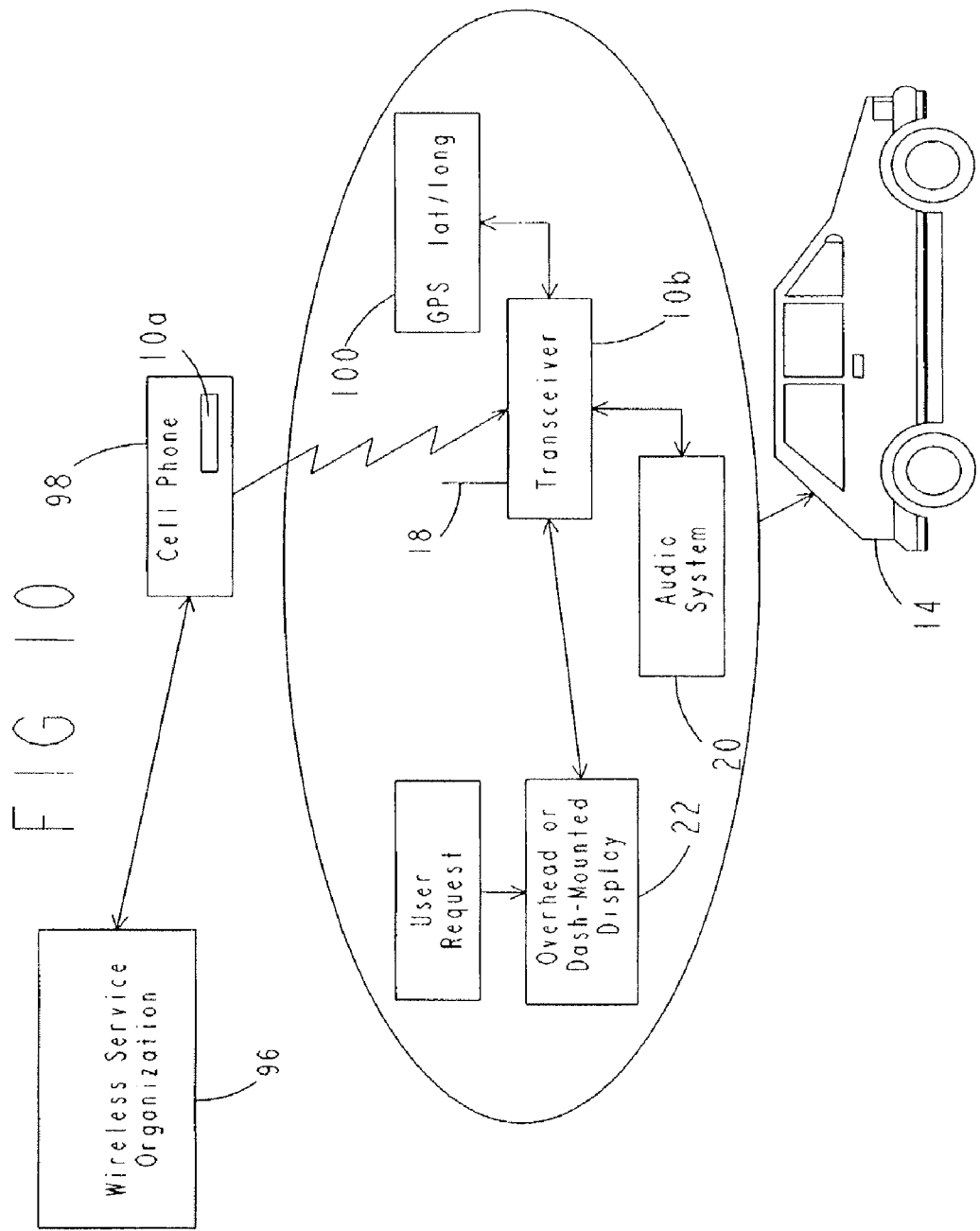
FIG. 10 is a block diagram of a wireless communications system being used to establish a wireless communications link between a cellular phone and various electronic subsystems of a motor vehicle after the cellular phone has linked with a wireless service organization.

Referring to FIG. 10, the wireless communications system 10 can also be used to enable information relating to various "points of interest" along a route being traveled by the user. This information could also be "personalized" information for the user from an Internet-based information service.

In this implementation, a cellular phone 98 is used by the user to make a connection with a wireless service organization 96. The cellular phone 98 includes the first RF transceiver 10a while the vehicle 14 includes the second RF transceiver 10b. A Global Positioning System ("GPS") device 100 onboard the vehicle 14 can be used to transmit latitude/longitude information to the cellular phone 98 over the wireless communications link established between the two RF transceivers 10a and 10b. The cellular phone 98 in turn can be used to link this information back to the wireless service organization 96. The wireless service organization 96 then transmits information on various points of interest near the vehicle's latitude and longitude coordinates back to the cellular phone 98, which in turn transmits this information via a wireless, high speed data link from its RF transceiver 10a to the RF transceiver 10b. The information is then displayed on the vehicle's display 22 and/or played over the vehicle's audio system 20. The point of interest information can include a wide variety of useful information such as restaurants, shopping, service stations, hospitals and other establishments in the vicinity of the vehicle. The information could be displayed in a menu format in which the user is able to select establishments and is provided with directions on the display system 22 to each establishment selected. Additional information concerning traffic conditions, road construction, etc., could also be provided.

Figure 11:
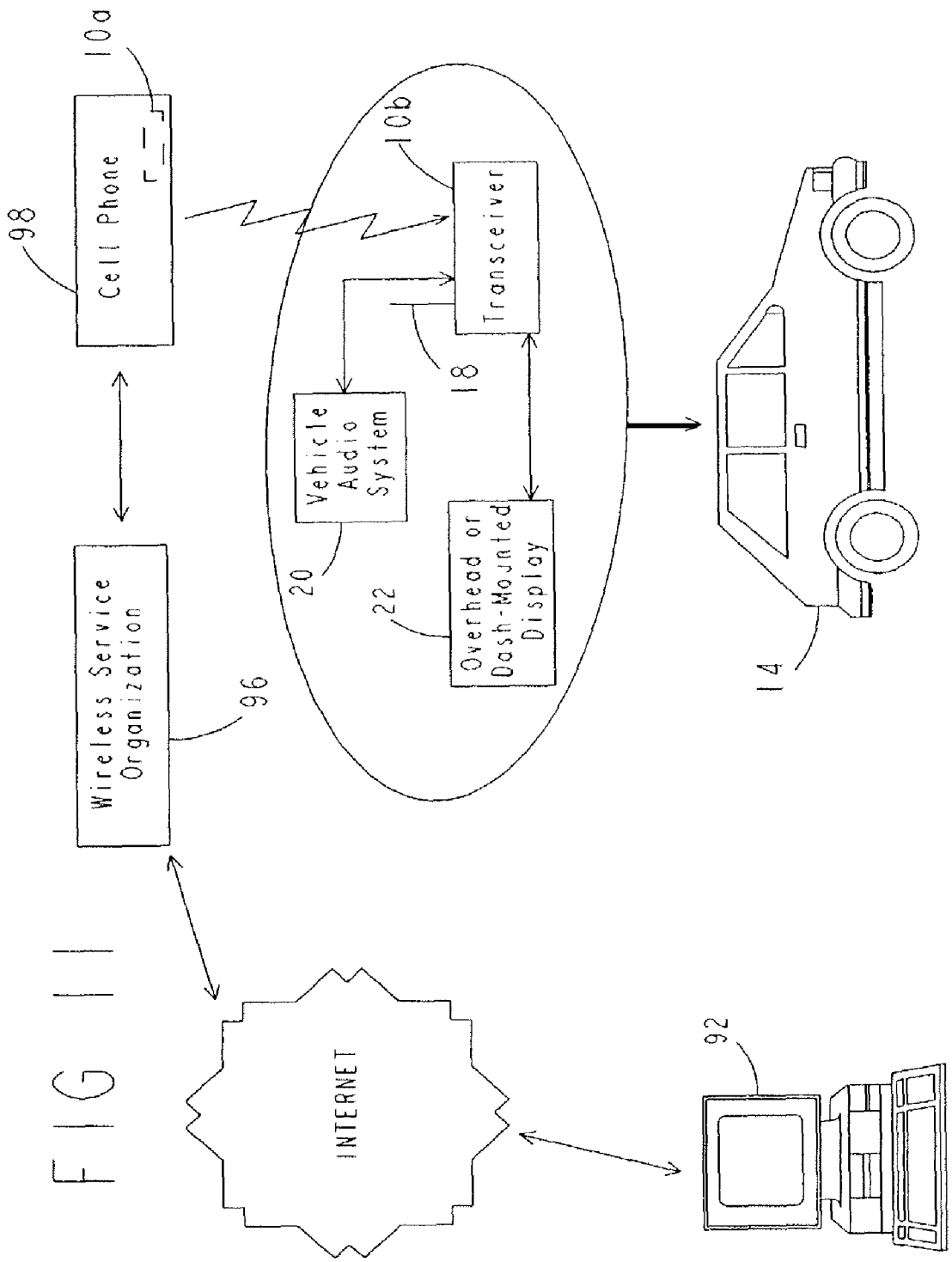
FIG. 11 is a block diagram of a wireless communications system being used to establish a wireless data link between a cellular phone of a user and one or more subsystems of a vehicle, where the cellular phone is linked with a wireless service organization so that "push" services from an Internet service provider can be used to provide personalized traffic, weather or other information automatically from the Internet to the user as the user travels in the vehicle.

Referring to FIG. 11, another implementation of the wireless communications system 10 is illustrated where "Push" technology is used to download information from the Internet automatically to the user traveling in the vehicle 14. A cellular phone 98 having the first RF transceiver 10a of the wireless communications system 10 establishes an automatic, high-speed wireless communications link with the second RF transceiver 10b located in the vehicle 14. The transceiver 10b is in communication with the vehicle's display system 22 and/or the vehicle's audio system 20.

The wireless service organization 96 is linked to the Internet and to the cellular phone 98. The user can use his/her home PC 92 (or alternatively a business PC) to create a "personalized" website through one of the presently available Internet-based news/search companies so that various personalized information such as selected financial information (i.e., stock price information), world or local news, traffic information along a specified route of travel, phone directory or personal calendar information, weather information, e-mail, etc., can be downloaded by the wireless service organization 96 and provided to the cellular phone 98. The RF transceivers 10a and 10b can then be used to transmit the information to the vehicle's display system 22 or audio system 20.

Figure 12:
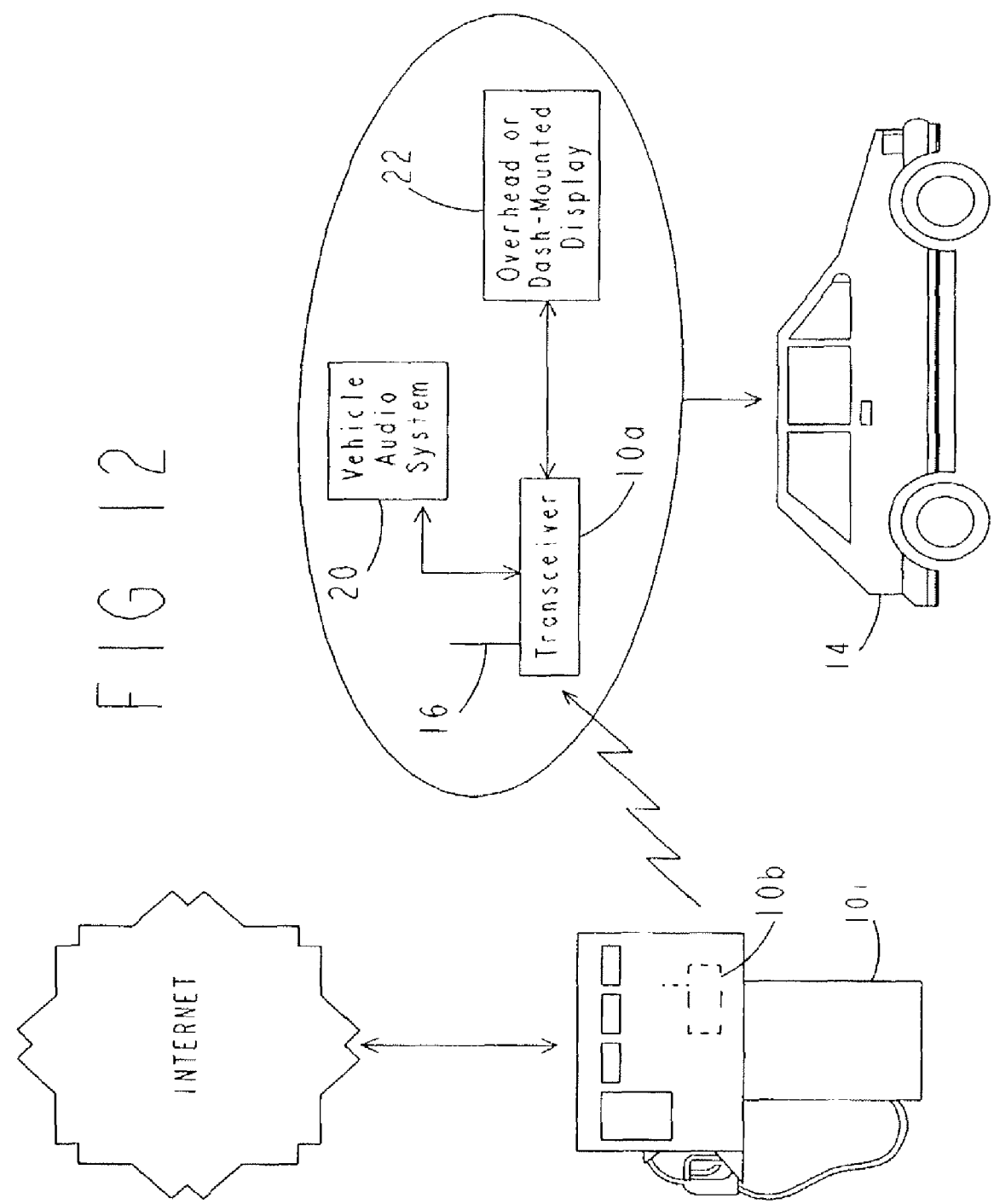
FIG. 12 is a block diagram of a wireless communications system being used to create a wireless data link between a gas pump kiosk of a service station and the subsystems of a vehicle, where the gas pump is linked to the Internet, such that information from the Internet can be transmitted in wireless fashion to one or more electronic subsystems of the vehicle while the vehicle is parked near the gas pump.

Referring to FIG. 12, a variation of the implementation shown in FIG. 11 is illustrated in which existing "push" technology is used to download personalized information from an Internet based information service to a suitable electronic system located at or closely adjacent to a gasoline pump 101, or at a kiosk including the gasoline pump 101, when the users vehicle 14 comes within the vicinity of the gasoline pump 101. In this implementation, the gasoline pump 101 includes the electronic device 12 which includes the RF transceiver 10b, and the vehicle 14 includes the RF transceiver 10a. The RF transceiver 10a is in communication with the vehicle's display 22 and/or audio system 20. When the vehicle 14 comes into reasonably close proximity (e.g., within 10 meters of the gasoline pump 101), the RF transceiver 10a automatically establishes a high speed, wireless communications link with the RF transceiver 10b of the electronic device 12. The RF transceiver 10a transmits appropriate identifying information to the RF transceiver 10b via the automatically established wireless communications link. This information is then linked to the Internet-based information service. Information is then transmitted back to the electronic system 12 associated with the gasoline pump 101. The information is then transmitted over the wireless communications link to the RF transceiver 10a located in the vehicle 14. It will be appreciated that this personalized information could also be obtained from the Internet by establishing wireless communications links with electronic devices located on road signs, freeway overpasses, at traffic lights and other points along a road or highway.

Figure 13:
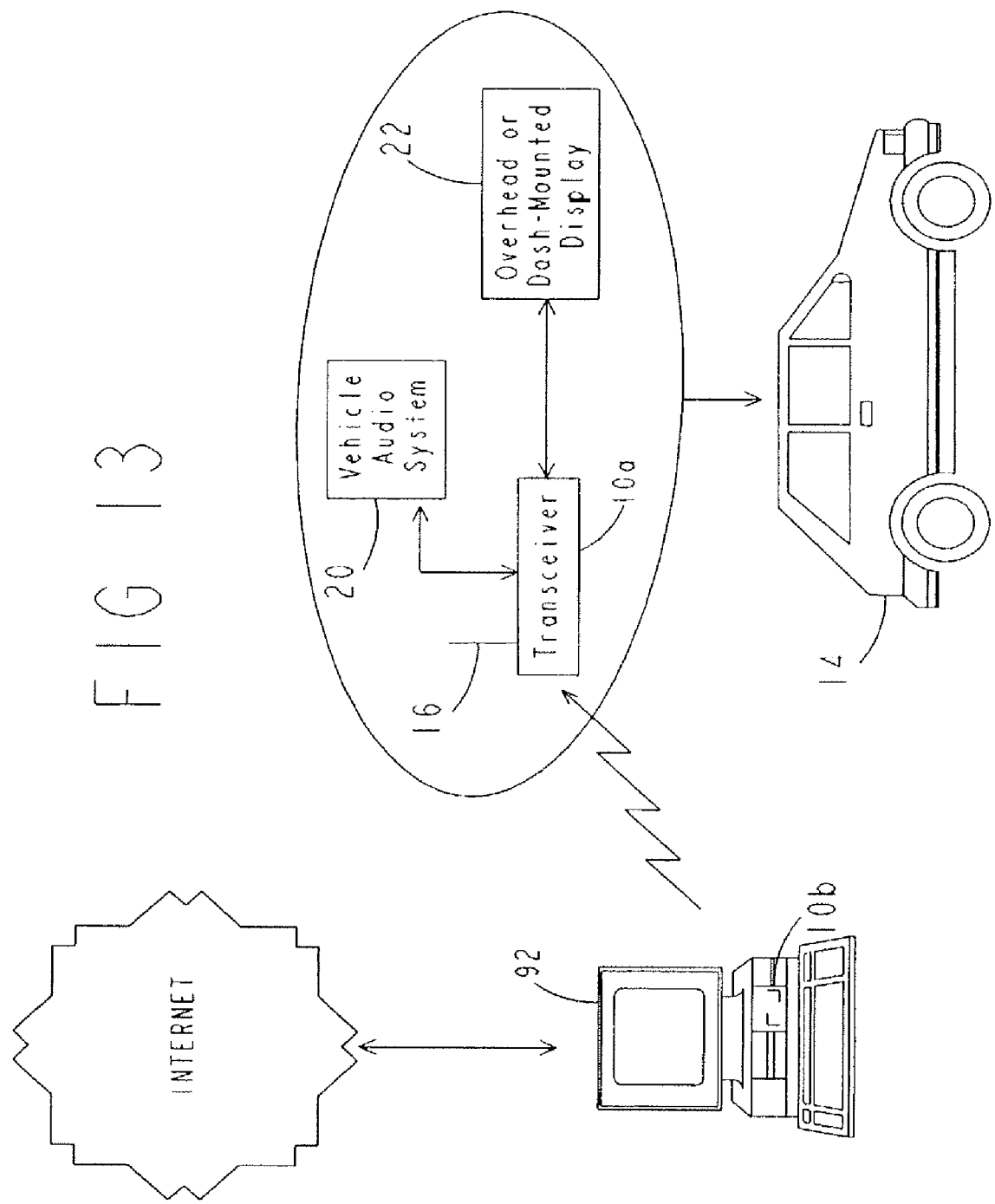
FIG. 13 is a block diagram of a wireless communications system being used to create a wireless data link for downloading map directions downloaded onto a home PC off of the Internet directly to one or more electronic subsystems of the vehicle while the vehicle is in close proximity to the home PC.

Referring to FIG. 13, another exemplary embodiment somewhat similar to that described in connection with FIG. 12 is provided. The implementation of FIG. 13 enables the wireless communications system 10 to provide a subset of map information needed for assisting a user of the vehicle 14 in traveling to a designated destination. In this implementation one RF transceiver 10a is located in the vehicle 14 and the other RF transceiver 10b is integrated with a PC 92, which may be located at the user's home or place of business. The user 14 can enter a command from either the PC 92 or from a suitable keyboard or control panel within the vehicle 14, or even from a cellular phone carried within the vehicle 14 and linked by two RF transceivers in accordance with the exemplary embodiments described herein, requesting directions for traveling to a particular destination. This request is transmitted to an Internet-based information organization where it is thereafter downloaded onto the PC 92. The information is then transmitted via the high-speed wireless communications link created by the RF transceivers 10a and 10b back to the vehicle 14 where it may be displayed on the vehicle's display 22 or possibly played on the vehicle's audio system 20. Since only a limited amount of information pertaining to the specific directions requested is transmitted back to the vehicle 14, this significantly reduces the amount of memory required to be located on-board the vehicle 14. It will be appreciated that this map information could just as easily be provided by linking to an electronic subsystem associated with the gasoline pump 101 (FIG. 12) or at some other location if the user becomes lost and suddenly requires directions to a different destination.

Figure 14:
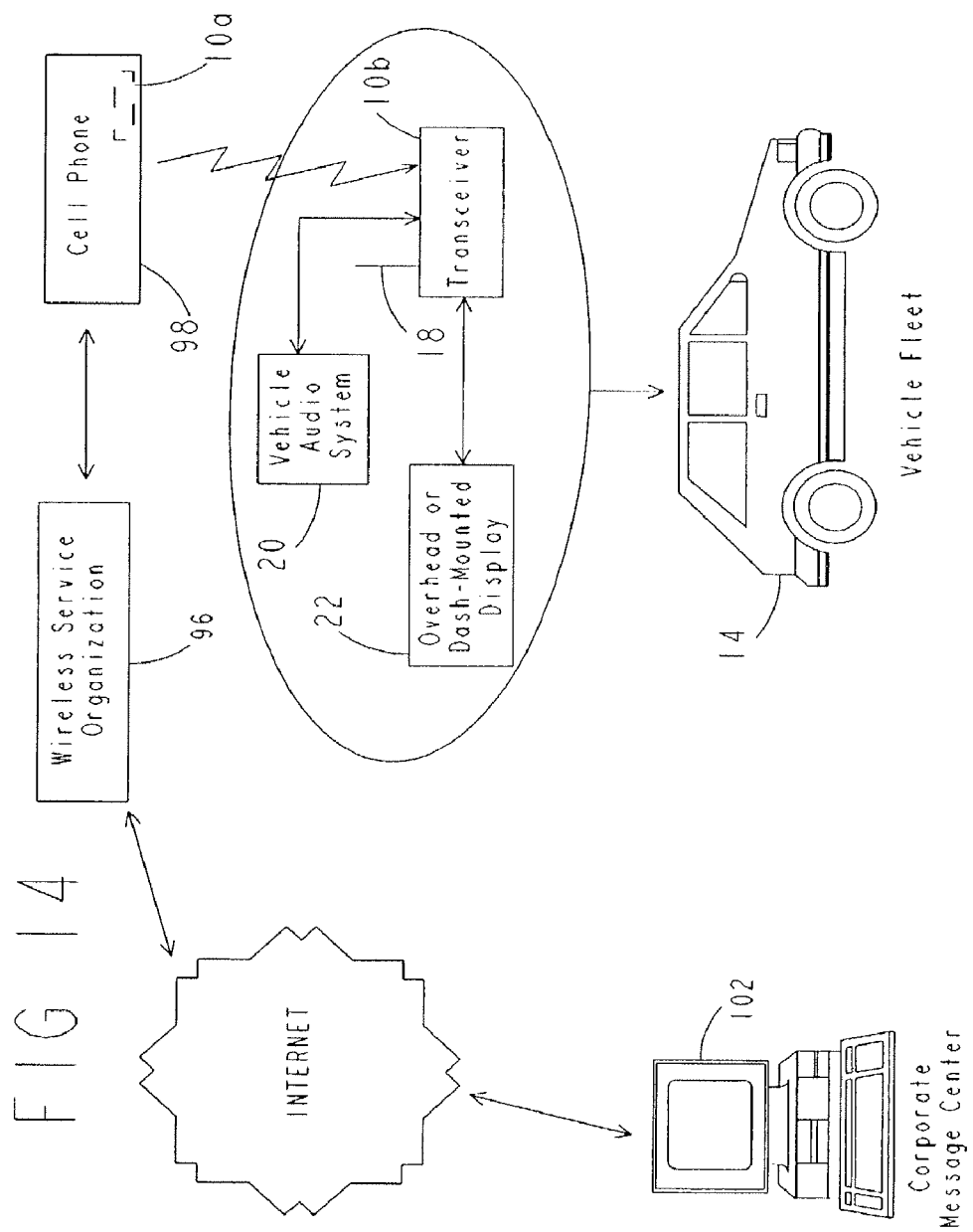
FIG. 14 is a block diagram of a wireless communications system being used to transmit corporate information or messages from a wireless service organization to a fleet vehicle, where the information is provided over the Internet from a corporate computer system, and such that the information can be provided via a wireless data link directly to the various subsystems of a fleet vehicle.

Referring now to FIG. 14, another implementation of the wireless communications system 10 is provided in which information from a business or a company is "pushed" into a company vehicle 14 from a corporate message center or corporate PC 102. The information from the corporate message center or PC 102 is transmitted via the Internet to the wireless service organization 96. A communications link is established between the wireless service organization 96 and the user's cellular phone 98. The cellular phone 98 includes one RF transceiver 10a of the apparatus 10 and the vehicle 14 includes the second RF transceiver 10b. Again, the RF transceiver 10b is in communication with the vehicle's display 22 and/or the vehicle's audio system 20. Important business information received by the cellphone 98 can then be downloaded via the wireless communications link created by the RF transceivers 10a and 10b to the user to apprise the user of important corporate news, events, scheduling or other information which needs to transmitted to the user on a timely basis. Again, this information could be replayed through suitable electronic relaying devices provided at gasoline pumps or at other points such as intersections, freeway overpasses, etc. that the vehicle 14 is expected to pass in proximity to during use.

Figure 15:
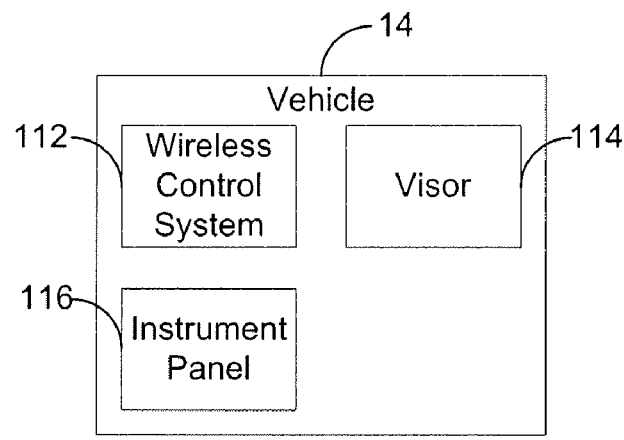
FIG. 15 is a block diagram of a vehicle having a wireless control system, according to an exemplary embodiment.

According to an alternative embodiment, RF transceiver 10b disposed within vehicle 14 can be a component in a wireless control system 112. Referring now to FIG. 15, vehicle 14 includes wireless control system 112. Wireless control system 112, the exemplary embodiments of which will be described below, is mounted to an overhead console of vehicle 14. Alternatively, one or more of the elements of wireless control system 112 may be mounted to other vehicle interior elements, such as, a visor 114 or instrument panel 116.

Advantageously, wireless control system 112 is a common feature found in many vehicles. Utilizing an existing transmitter minimizes installation of additional equipment and reduces production costs.

Figure 16:
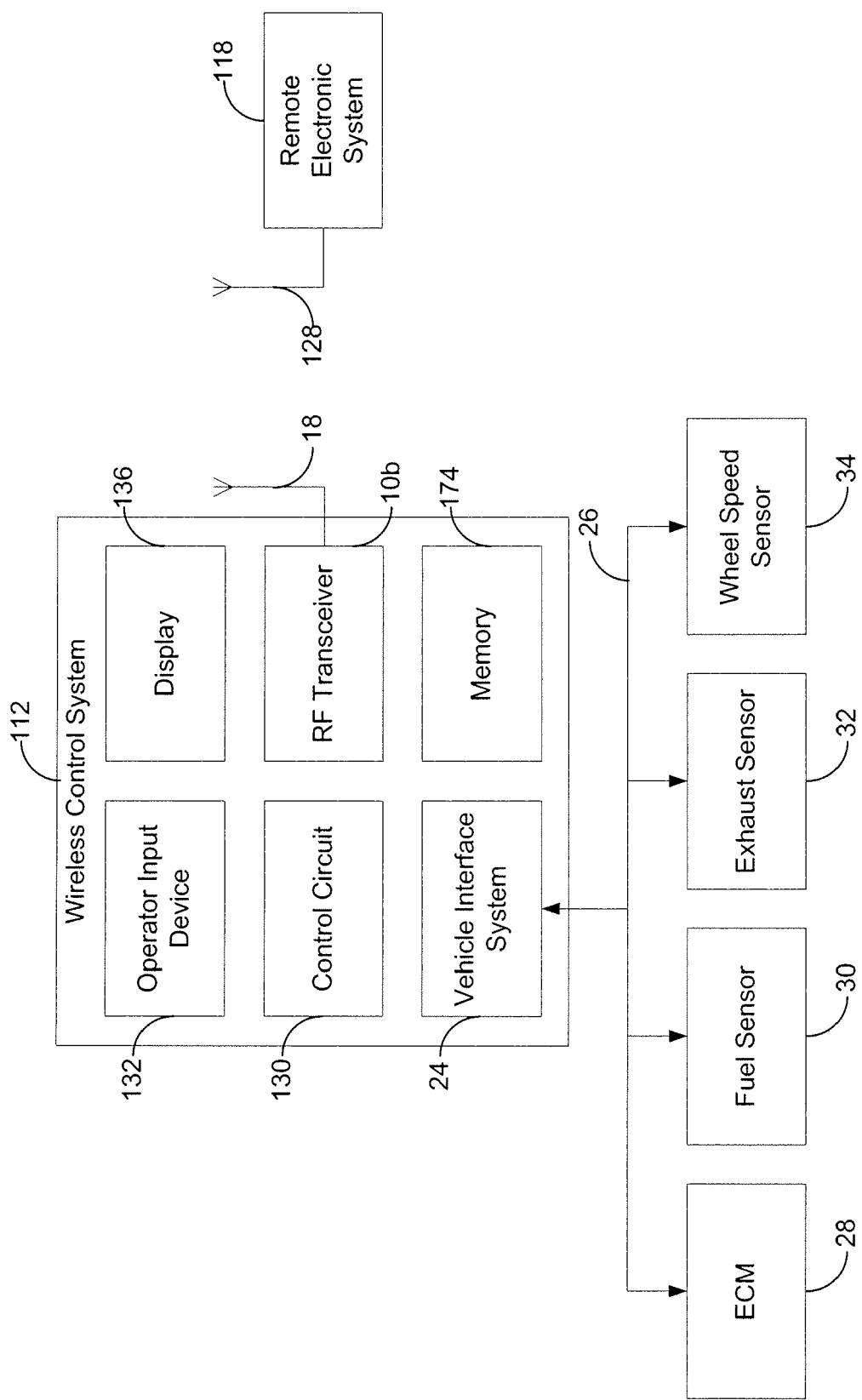
FIG. 16 is a block diagram of a wireless control system and a remote electronic system, according to an exemplary embodiment.

Referring now to FIG. 16, wireless control system 112 is illustrated along with a remote electronic system 118 which may be any of a plurality of home electronic systems, such as, a garage door opener, a security gate control system, security lights, home lighting fixtures or appliances, a home security system, etc. For example, remote electronic system 118 may be a garage door opener, such as the Whisper Drive® garage door opener, manufactured by the Chamberlain Group, Inc., Elmhurst, Ill. Remote electronic system 118 may also be a lighting control system using the X10 communication standard. Remote electronic system 118 includes an antenna 128 for receiving activation signals including control data which will control remote electronic system 118. The activation signals are preferably in the ultra-high frequency (UHF) band of the radio frequency spectrum, but may alternatively be infrared signals or other wireless signals.

Wireless control system 112 includes a control circuit 130 configured to control the various portions of system 112, to store data in memory, to operate preprogrammed functionality, etc. Control circuit 130 may include various types of control circuitry, digital and/or analog, and may include a microprocessor, microcontroller, application-specific integrated circuit (ASIC), or other circuitry configured to perform various input/output, control, analysis, and other functions to be described herein. Control circuit 130 is coupled to an operator input device 132 which includes one or more push button switches 134 (see FIG. 17), but may alternatively include other user input devices, such as, switches, knobs, dials, etc., or even a voice-actuated input control circuit configured to receive voice signals from a vehicle occupant and to provide such signals to control circuit 130 for control of system 112. Trainable transceiver 112 further includes a memory 174, which may be a volatile or non-volatile memory, and may include read only memory (ROM), random access memory (RAM), flash memory, or other memory types.

Control circuit 130 is further coupled to a display 136 which includes a light-emitting diode (LED), such as, display element 138. Display 136 may alternatively include other display elements, such as a liquid crystal display (LCD), a vacuum florescent display (VFD), etc.

Trainable transceiver 112 further includes RF transceiver 10b including transmit and/or receive circuitry configured to communicate via antenna 18 with remote electronic system 118. RF transceiver 10b is configured to transmit wireless control signals having control data which will control remote electronic system 118. RF transceiver 10b is configured, under control from control circuit 130, to generate a carrier frequency at any of a number of frequencies in the ultra-high frequency range, preferably between 260 and 470 megaHertz (MHz), wherein the control data modulated on to the carrier frequency signal may be frequency shift key (FSK) or amplitude shift key (ASK) modulated, or may use another modulation technique. The control data on the wireless control signal may be a fixed code or a rolling code or other cryptographically encoded control code suitable for use with home electronic system 118.

Trainable transceiver 112 further includes the vehicle interface system 24. As stated above, vehicle interface system 24 can be configured for two way communications via data bus 26 with various electronic subsystems of the vehicle 14 such as the Electronic Control Module (ECM) 28, the fuel sensor 30, the exhaust sensor 32, the wheel speed sensor 34 or virtually any other form of sensor which provides an electronic output signal related to its operation. Additionally, vehicle interface system 24 can also provide communication with any other system not including a sensor. Systems can include a vehicle information center, a cellular phone system, a vehicle navigation system, a Travelnote® system, etc. The systems and devices can be positioned external to wireless communication system 112 such that they are not connected by a wired connection to control circuit 130.

Figure 17:
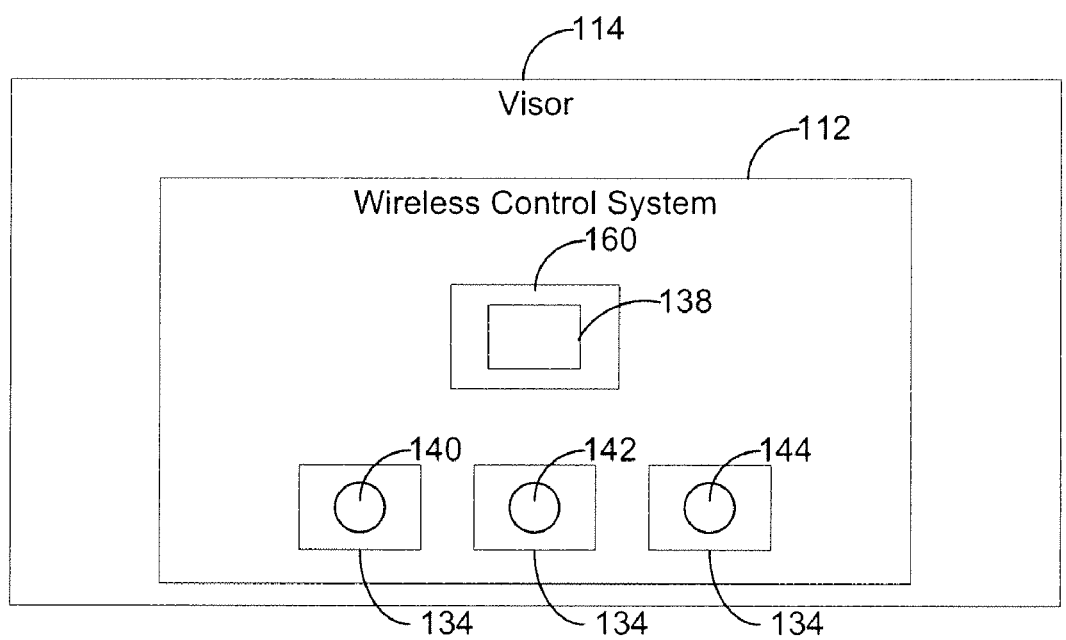
FIG. 17 is a schematic diagram of a visor having a wireless control system mounted thereto, according to an exemplary embodiment.

Referring now to FIG. 17, an exemplary trainable transceiver 112 is illustrated coupled to a vehicle interior element, namely a visor 114. Visor 114 is of conventional construction, employing a substantially flat, durable interior surrounded by a cushioned or leather exterior. Trainable transceiver 112 is mounted or fixedly coupled to visor 114 by fasteners, such as, snap fasteners, barbs, screws, bosses, etc. and includes a molded plastic body 58 having three push button switches disposed therein. Each of the switches includes a respective back-lit icon 140, 142, 144. Body 158 further includes a logo 160 inscribed in or printed on body 158 and having an display element 138 disposed therewith. During training and during operation, display element 138 is selectively lit by control circuit 130 (FIG. 16) to communicate certain information to the user, such as, whether a training process was successful, whether the control system 112 is transmitting a wireless control signal, etc. The embodiment shown in FIG. 17 is merely exemplary, and alternative embodiments may take a variety of shapes and sizes, and have a variety of different elements.

In operation, trainable transceiver 112 is configured to receive one or more characteristics of an activation signal sent from an original transmitter. The original transmitter is a transmitter, typically a hand-held transmitter, which is sold with remote electronic system 118 or as an after-market item, and which is configured to transmit an activation signal at a predetermined carrier frequency and having control data configured to actuate remote electronic system 119. For example, the original transmitter can be a hand-held garage door opener transmitter configured to transmit a garage door opener signal at a frequency, such as 355 megaHertz (MHz), wherein the activation signal has control data, which can be a fixed code or a cryptographically-encoded code. Remote electronic system 118 is configured to open a garage door, for example, in response to receiving the activation signal from the original transmitter.

Trainable transceiver 118 is configured to receive one or more characteristics of the activation signal from a original transmitter or from another source, which characteristics can include the frequency, control data, modulation scheme, etc. In this embodiment, trainable transceiver is configured to learn at least one characteristic of the activation signal by receiving the activation signal, determining the frequency of the activation signal, and demodulating the control data from the activation signal. Trainable transceiver 112 can be a HomeLink® trainable transceiver and may be constructed according to one or more embodiments disclosed in U.S. Pat. No. 6,091,343, U.S. Pat. No. 5,854,593 or U.S. Pat. No. 5,708,415, which are herein incorporated by reference in their entirety. Alternatively, trainable transceiver 112 can receive one or more characteristics of the activation signal by other methods of learning. For example, the one or more characteristics of the activation signal can be preprogrammed into memory 174 during manufacture of trainable transceiver 112 or can be input via operator input device 132 (which can include a key pad, buttons, etc.). In this manner, trainable transceiver 112 need not actually receive the activation signal in order to receive the characteristics of the signal by any of these methods and store the characteristics of the activation signal in memory 174.

According to one exemplary embodiment, trainable transceiver 112 is fixedly coupled to a vehicle interior element. This fixed coupling provides a convenient location for a trainable transmitter in vehicle 14, and further prevents an operator from losing, misplacing, dropping, or otherwise losing control of trainable transceiver 112. The term "fixedly coupled" refers to the characteristic that trainable transceiver 112 is not removable from the vehicle interior element, though it may be moved within the vehicle interior element (for example, in a sliding configuration).

While the exemplary embodiments are illustrated in the FIGS. and described herein, it should be understood that these embodiments are offered by way of example only. For example, alternative embodiments may be suitable for use in the commercial market, wherein office lights or security systems or parking garage doors are controlled. Accordingly, the described features are not limited to a particular embodiment, but extend to various modifications that nevertheless fall within the scope of the appended claims.

It will be appreciated than that an extremely large variety of useful implementations of the wireless communications system 112 may be created. While the Bluetooth communications standard or the SWAP-CA standard may be used with the RF transceivers 10a and 10b, it will be appreciated that other communications specifications may also be employed. Additionally, while many of the implementations described herein have made use of a motor vehicle, it will be appreciated that the RF transceivers 10a and 10b could just as easily be used to effect high-speed wireless communications links between virtually any two electronic devices which come into proximity with one another, and where it would be useful to transfer information from one device to the other.

Those skilled in the art can now appreciate from the foregoing description that the broad teachings herein can be implemented in a variety of forms. Therefore, while the described features have been described in connection with particular examples thereof, the true scope of the features should not be so limited since other modifications will become apparent to the skilled practitioner upon a study of the drawings and the present specification.

What is claimed is:

1. A wireless control system for use in a vehicle and for use with a remote electronic system, the wireless control system comprising: a transceiver for mounting in the vehicle and configured to communicate according to a bi-directional data communications protocol that operates in the 2.4 GHz ISM RF band; and a control circuit for learning a carrier frequency and control information expected by the remote electronic system; wherein the control circuit is further configured to cause the transceiver to transmit a control signal to the remote electronic system according to the learned carrier frequency, the control information, or the learned carrier frequency and the control information; wherein the control circuit causes the transceiver to transmit the control signal to the remote electronic system using a cryptographically encoded rolling code for use with the remote electronic system; wherein the transceiver is configured to form a wireless data communications link with a device external the vehicle and wherein the transceiver is configured to receive a code via the wireless data communications link and to provide the code to the control circuit, wherein the control signal is based on the received code.

2. The wireless control system of claim 1, wherein the remote electronic system is a garage door opener.

3. The wireless control system of claim 2, further comprising:
memory for storing the learned carrier frequency and control information.

4. The wireless control system of claim 1, wherein the remote electronic system is one of a garage door opener, a security system, and a lighting system.

5. The wireless control system of claim 1, wherein the control circuit causes the transceiver to transmit a control signal at a frequency of between 260 and 470 MHz.

6. A control system for use in a vehicle and for controlling a remote electronic system, the control system comprising: a transceiver configured to send and receive information according to a bi-directional data communications protocol that operates in the 2.4 GHz ISM RF band; wherein the transceiver is configured to operate as a trainable transmitter by transmitting a control signal using a cryptographically encoded rolling code for controlling the remote electronic system; and a control circuit configured to control the trainable transmitter; wherein the transceiver is configured to form a wireless data communications link with a device external the vehicle and wherein the transceiver is configured to receive a code via the wireless data communications link and to provide the code to the control circuit, the control circuit configured to cause the trainable transmitter to transmit the control signal for controlling the remote electronic system, the control signal based on the code.

7. The control system of claim 6, wherein the device is a mobile phone or a personal digital assistant.

* * * * *